United States Patent [19]
Koh et al.

[11] Patent Number: 5,895,140
[45] Date of Patent: Apr. 20, 1999

[54] CONTROL SYSTEM FOR COMMUNICATIONS BETWEEN DRIVING UNITS AND CONTROL UNITS

[75] Inventors: Shokyo Koh; Tokuharu Kaneko, both of Mishima; Akimaro Yoshida, Yokohama, all of Japan

[73] Assignee: Canon Kabushiki Kaisha, Tokyo, Japan

[21] Appl. No.: 08/955,280

[22] Filed: Oct. 21, 1997

[30] Foreign Application Priority Data

Oct. 22, 1996 [JP] Japan .................. 8-297942

[51] Int. Cl.$^6$ .................................. G03G 15/00
[52] U.S. Cl. .................. 399/77; 318/625; 318/5; 340/825.06
[58] Field of Search ................. 399/76, 77, 78, 399/208, 402; 318/625, 4, 5; 340/825.06, 825.14, 825.22; 364/131; 395/115

[56] References Cited

U.S. PATENT DOCUMENTS

| | | | |
|---|---|---|---|
| 4,959,600 | 9/1990 | DiGiulio et al. | 318/625 |
| 4,970,544 | 11/1990 | Furusawa et al. | 355/24 |
| 5,455,688 | 10/1995 | Furukawa et al. | 358/442 |

*Primary Examiner*—Joan Pendegrass
*Attorney, Agent, or Firm*—Fitzpatrick, Cella, Harper & Scinto

[57] ABSTRACT

An image forming apparatus including a status detecting unit for detecting a status of each portion of the apparatus, a driving unit for driving each portion of the apparatus, an input unit having an input data storing unit for storing input data detected by the status detecting unit, an output unit having an output data storing unit for storing data to be output for driving the driving unit, a controlling unit connected to the input data storing unit and the output data storing unit for controlling the whole image forming operation of the apparatus including a control of the driving unit, in accordance with a status detected with the status detecting unit or a predetermined rule, a network for transferring data between the controlling unit and a plurality of the input or output units, and a timing control unit for controlling the timing of data transfer over the network, wherein the timing control unit includes a plurality of timing control modes and selects one of the timing control modes in accordance with an instruction from the controlling unit. The plurality of timing control modes of the timing control unit includes a first timing mode of performing data transfer in accordance with a timing generated by the controlling unit and a second timing mode of performing data transfer independently from the timing generated by the controlling unit. The second timing mode is a mode of performing data transfer at a predetermined time interval.

12 Claims, 20 Drawing Sheets

*FIG. 8*

|  | R/W | A2 | A1 | A0 | FUNCTIONS |
|---|---|---|---|---|---|
| TRANSMISSION MODE | 0 | 0 | 0 | 0 | SELECTION ACCESS MODE ADDRESS 0 |
| | 0 | 0 | 0 | 1 | SELECTION ACCESS MODE ADDRESS 1 |
| | 0 | 0 | 1 | 0 | SELECTION ACCESS MODE ADDRESS 2 |
| | 0 | 0 | 1 | 1 | (RESERVE AREA) |
| | 0 | 1 | 0 | 0 | (RESERVE AREA) |
| | 0 | 1 | 0 | 1 | (RESERVE AREA) |
| | 0 | 1 | 1 | 0 | CONNECTION CHECK MODE |
| | 0 | 1 | 1 | 1 | (RESERVE AREA) |
| RECEIVING MODE | 1 | 0 | 0 | 0 | SELECTION ACCESS MODE ADDRESS 0 |
| | 1 | 0 | 0 | 1 | SELECTION ACCESS MODE ADDRESS 1 |
| | 1 | 0 | 1 | 0 | SELECTION ACCESS MODE ADDRESS 2 |
| | 1 | 0 | 1 | 1 | (RESERVE AREA) |
| | 1 | 1 | 0 | 0 | (RESERVE AREA) |
| | 1 | 1 | 0 | 1 | (RESERVE AREA) |
| | 1 | 1 | 1 | 0 | (RESERVE AREA) |
| | 1 | 1 | 1 | 1 | RESET MODE |

FIG. 10

| BIT | CONTENTS |
|---|---|
| 0000 | 4-PHASE 1-EXCITATION UPPER |
| 0001 | 4-PHASE 2-EXCITATION UPPER |
| 0010 | 4-PHASE 1·2-EXCITATION UPPER |
| 0011 | 4-PHASE 1-EXCITATION LOWER |
| 0100 | 4-PHASE 2-EXCITATION LOWER |
| 0101 | 4-PHASE 1·2-EXCITATION LOWER |
| 0110 | 5-PHASE 1-EXCITATION |
| 0111 | 5-PHASE 2-EXCITATION |
| 1000 | 5-PHASE 1·2-EXCITATION |
| 1001 | 5-PHASE 2·3-EXCITATION |

FIG. 11

| BIT | CONTENTS |
|---|---|
| 00 | SWITCHING STOP |
| 01 | AUTOMATIC CONTROL (STROBE INHIBITION) |
| 10 | AUTOMATIC CONTROL (STROBE ALLOWANCE) |
| 11 | EXTERNAL TRIGGER |

FIG. 12

| STEP | 7 MSB | 6 | 5 | 4 | 3 | 2 | 1 | 0 LSB | NOTE |
|---|---|---|---|---|---|---|---|---|---|
| 1 | X | X | X | 1 | 0 | 0 | 0 | 0 | INITIAL POSITION WHEN NORMAL ROTATION |
| 2 | X | X | X | 1 | 0 | 0 | 0 | 1 | |
| 3 | X | X | X | 0 | 0 | 0 | 0 | 1 | |
| 4 | X | X | X | 0 | 0 | 0 | 0 | 1 | |
| 5 | X | X | X | 0 | 0 | 0 | 1 | 1 | |
| 6 | X | X | X | 0 | 0 | 1 | 1 | 0 | |
| 7 | X | X | X | 0 | 0 | 1 | 0 | 0 | |
| 8 | X | X | X | 0 | 1 | 1 | 0 | 0 | |
| 9 | X | X | X | 0 | 1 | 0 | 0 | 0 | |
| 10 | X | X | X | 1 | 1 | 0 | 0 | 0 | INITIAL POSITION WHEN REVERSE ROTATION |

| INPUT CLOCK | CYCLE |
|---|---|
| T1( 8/fc ) | 400ns |
| T4( 32/fc ) | 1.6us |
| T16( 128/fc ) | 6.4us |
| T256*2048/fc | 102us | and driver registers near CPU which controls the whole of the apparatus. This is one factor of making the size of a control circuit board large.
CONTROL SYSTEM FOR COMMUNICATIONS BETWEEN DRIVING UNITS AND CONTROL UNITS

BACKGROUND OF THE INVENTION

1. Field of the Invention

The present invention relates to a control system for communications between driving units and control units.

2. Related Background Art

Data for driving each component of an image forming apparatus or detected data representative of the status of each component is stored in a register located at a partial area of an address space of a CPU which controls the whole of the apparatus. The contents of this register are directly supplied to a transistor which drives a load such as a clutch of the apparatus or to a sensor which detects a presence/absence of a recording sheet.

Specifically, CPU which controls the whole of the apparatus reads data in an input register (one type of the above-described register dedicated to data input) to thereby monitor a status detected with a status detecting unit, or writes data in an output register (one type of the above-described register dedicated to data output) to thereby drive each component of the apparatus.

With the above-described conventional structure of the apparatus, however, it is necessary to mount input registers, output registers, and driver registers near CPU which controls the whole of the apparatus. This is one factor of making the size of a control circuit board large.

Control signal lines are led out of and pulled into the control circuit board, as many as the number proportional to that of those sensors which detect a presence/absence of a clutch for driving a load, a recording sheet or the like. A number of control signal lines are therefore disposed at the periphery of the control circuit board, so that difficulties of effective usage of mounting space and of assembly are becoming conspicuous. Such difficulties become serious as the length of each control signal line from the control circuit board to the load or sensor becomes long, and the number of such control signal lines becomes large as the apparatus becomes large and sophisticated.

The control circuit board is designed to be optimum in accordance with the number of sensors and loads such as a clutch used by the apparatus. Therefore, it is required to redesign the control circuit board each time the configuration of the apparatus is changed.

In order to solve the above problems, one method has been proposed in which processes heretofore performed by one control CPU are distributed to a plurality of control CPUs to physically divide one control circuit board. With t his method, however, other problems occurs such as overhead of communication protocols and high cost of additional CPUs, ROMs and RAMs caused by the division of CPU. Furthermore, use of this method makes it difficult to realize a control circuit board having high operability between different applications.

SUMMARY OF THE INVENTION

It is an object of the present invention to provide an apparatus capable of solving the above problems.

It is another object of the present invention to provide an apparatus capable of performing a control operation with high precision while minimizing a load of a control unit communicating with a driving unit.

It is another object of the present invention to provide an apparatus, capable of providing a sufficient mount space of a control board, considerably reducing the number of signal lines from the control board to an input unit or output unit, providing high operability of the control board between different applications, and alleviating a process load of a control CPU.

According to one aspect of the present invention, there is provided a controller comprising: first driving means for driving a load not requiring a precise driving timing; second driving means for driving a load requiring a precise driving timing; first control means for controlling the first and second driving means; and second control means for controlling the communication between the first and second driving means and the first control means, the second control means communicating with the first driving means independently from a timing signal generated by the first control means and communicating with the second driving means in accordance with the timing signal generated by the first control means.

According to another aspect of the present invention, there is provided an image forming apparatus comprising: status detecting means for detecting a status of each portion of the apparatus; driving means for driving each portion of the apparatus; an input unit having input data storing means for storing input data detected by the status detecting means; an output unit having output data storing means for storing data to be output for driving the driving means; controlling means connected to the input data storing means and the output data storing means for controlling the whole image forming operation of the apparatus including a control of the driving means, in accordance with a status detected with the status detecting means or a predetermined rule; network means for transferring data between the controlling means and a plurality of input or output units; and timing control means for controlling the timing of data transfer over the network means, wherein the timing control means includes a plurality of timing control modes and selects one of the timing control modes in accordance with an instruction from the controlling means.

According to still another aspect of the present invention, there is provided a method of controlling an image forming apparatus comprising the steps of: preparing an image forming apparatus comprising: status detecting means for detecting a status of each portion of the apparatus, driving means for driving each portion of the apparatus, an input unit having input data storing means for storing input data detected by the status detecting means, an output unit having output data storing means for storing data to be output for driving the driving means, controlling means connected to the input data storing means and the output data storing means for controlling the whole image forming operation of the apparatus including a control of the driving means, in accordance with a status detected with the status detecting means or a predetermined rule, network means for transferring data between the controlling means and a plurality of input or output units, and timing control means for controlling the timing of data transfer over the network means; providing the timing control means with a plurality of timing control modes; and selecting one of the timing control modes in accordance with an instruction from the controlling means.

The other objects and features of the present invention will become apparent from the following detailed description when read in conjunction with the accompanying drawings.

BRIEF DESCRIPTION OF THE DRAWINGS

FIG. 8 is a diagram illustrating the designation of a communication mode by SIOC.

FIG. 10 is a diagram illustrating the setting of phase excitation patterns.

FIG. 11 is a diagram illustrating the setting of bits of pattern switching control.

FIG. 12 is a diagram illustrating an example of phase data setting.

DETAILED DESCRIPTION OF THE PREFERRED EMBODIMENTS

Embodiments of the invention will be described with reference to the accompanying drawings.

Figure 1:
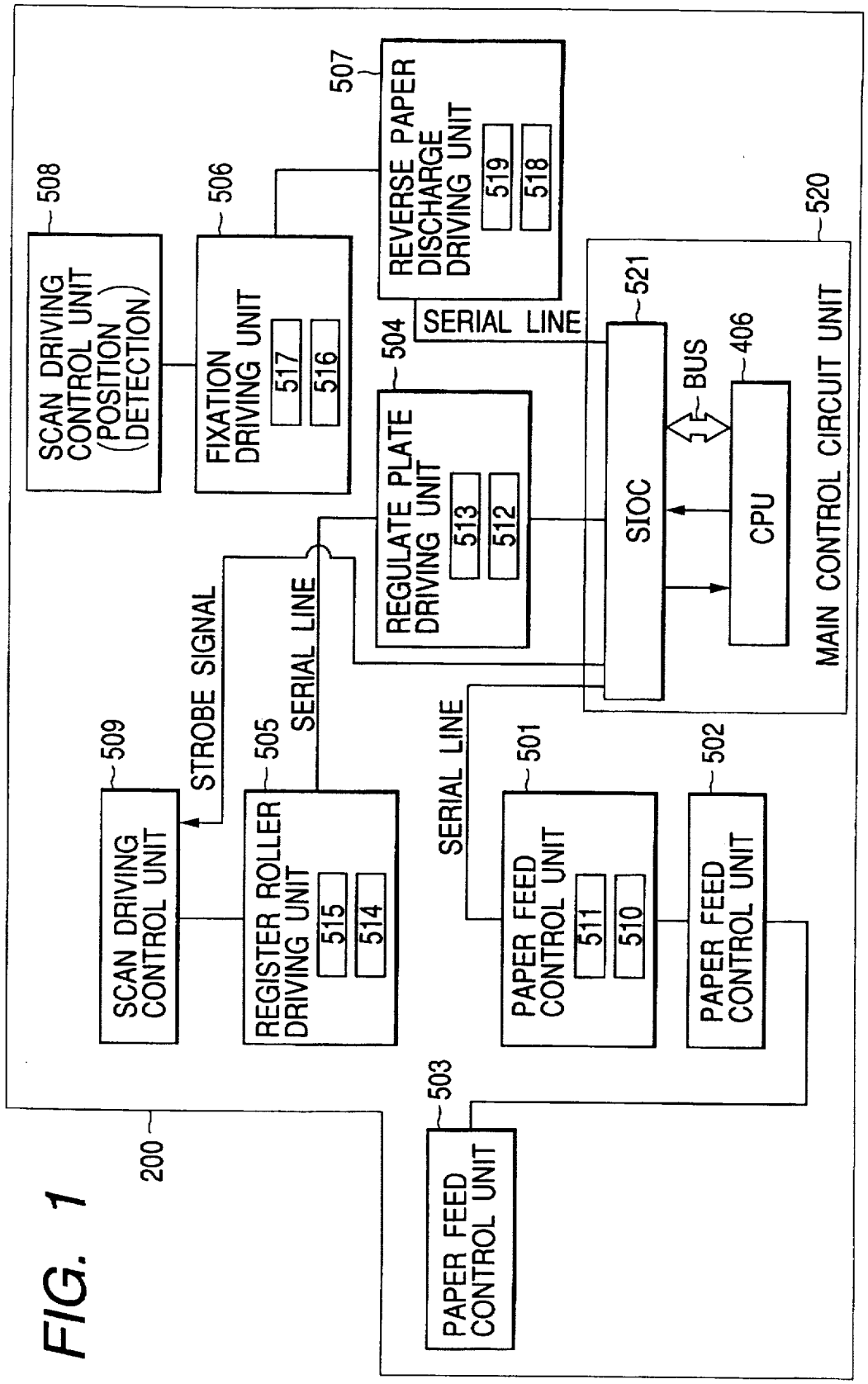
FIG. 1 is a block diagram showing the characteristic features of an image forming apparatus according to an embodiment of the invention.
Figure 2:
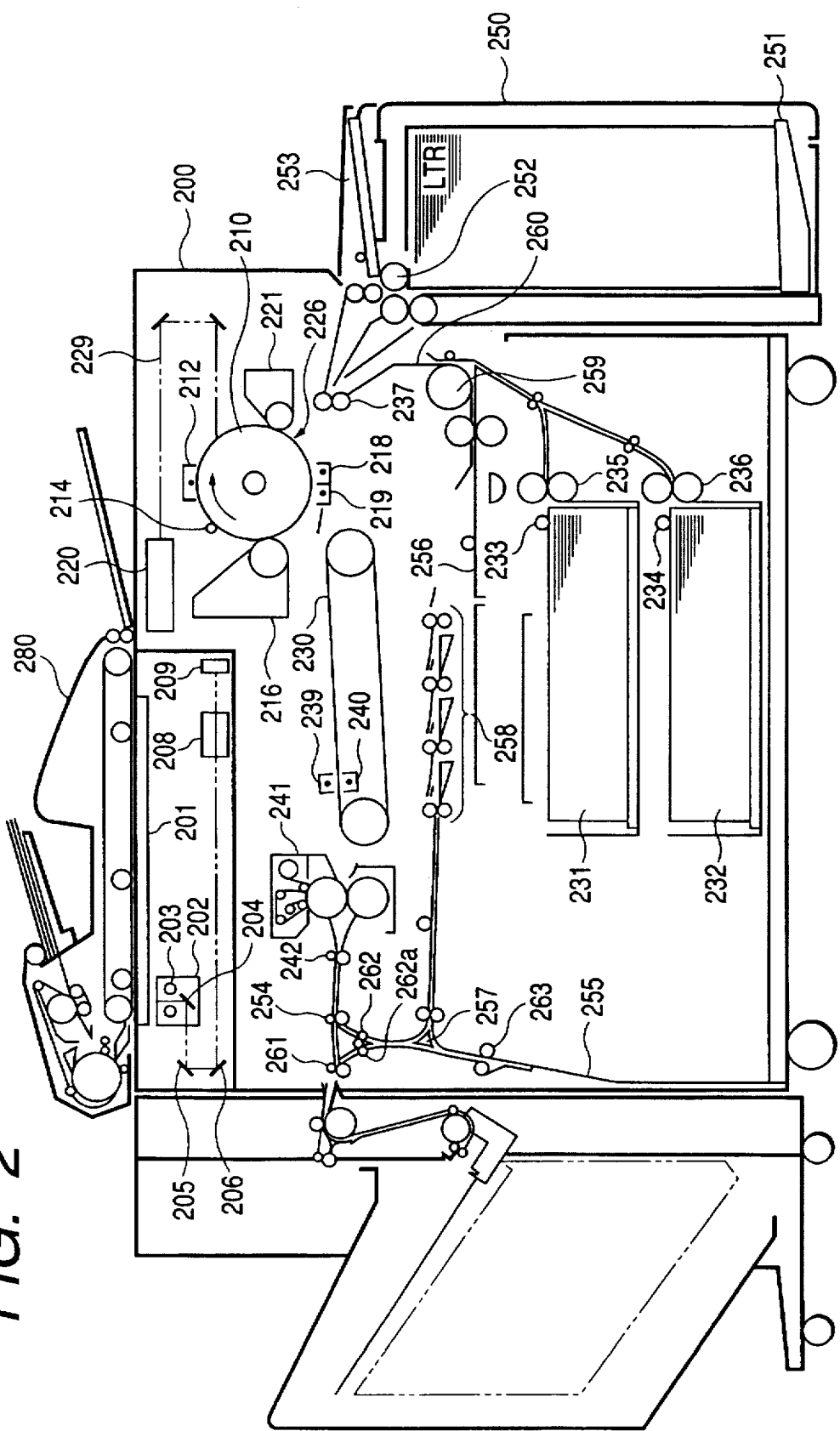
FIG. 2 is a cross sectional view showing one example of the cross section of the image forming apparatus of the embodiment.
Figure 3:
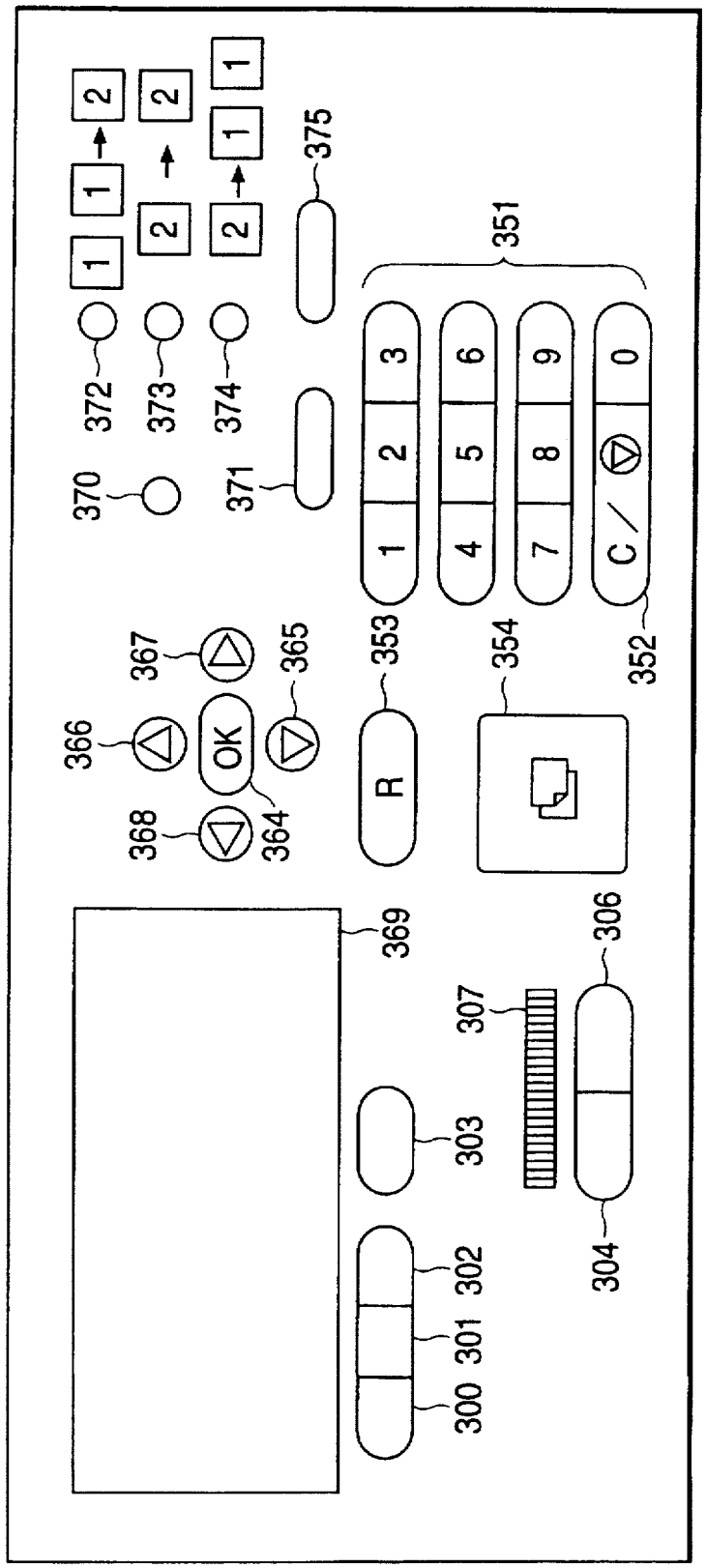
FIG. 3 is a diagram showing a console unit of the image forming apparatus of the embodiment.
Figure 4:
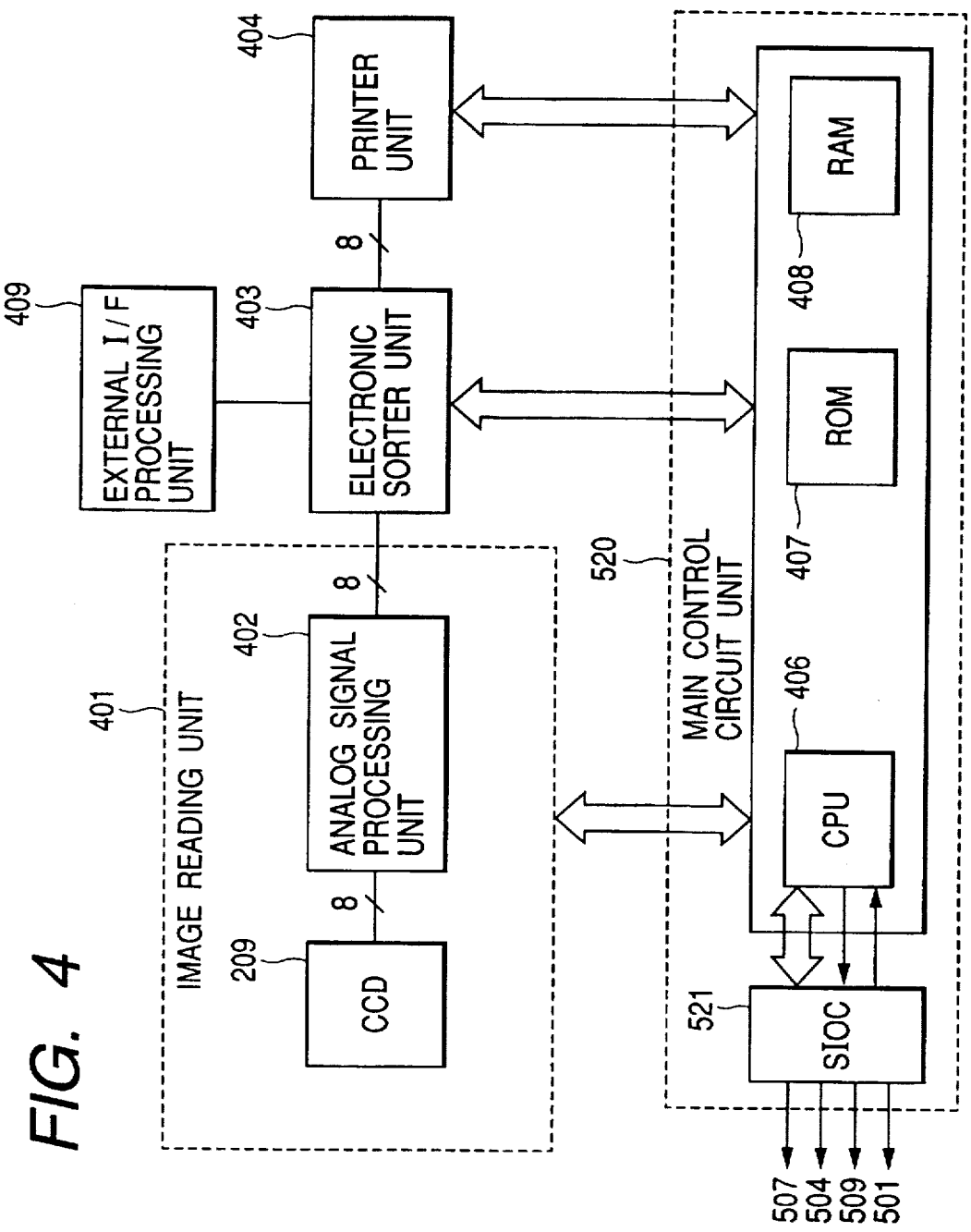
FIG. 4 is a block diagram showing the structure of the image forming apparatus of the embodiment.

FIG. 1 is a block diagram showing the characteristic features of an image forming apparatus according to an embodiment of the invention, FIG. 2 is a cross sectional view showing one example of the cross section of the image forming apparatus of the embodiment, FIG. 3 is a diagram showing a console unit of the image forming apparatus of the embodiment, and FIG. 4 is a block diagram showing the structure of the image forming apparatus of the embodiment.

Referring first to FIG. 2, reference numeral 200 represents the main frame of an image forming apparatus, and reference numeral 280 represents a cyclical type automatic original feeder (RFD). Reference numeral 201 represents a platen glass as an original placing plate, reference numeral 202 represents a scanner, reference numeral 203 represents an original illuminating lamp, and reference numeral 204 represents a scanning mirror.

The scanner is reciprocally driven in predetermined directions with an unrepresented motor, to focus a reflected light beam from an original onto a CD sensor 209 via scanning mirrors 204 to 206 and a lens 208. Reference numeral 207 represents an exposure control unit made of a laser, a polygon scanner and the like. The exposure control unit 207 operates in such a manner that a laser beam 229 modulated with an image signal is converted into an electrical signal by the image sensor unit 209 and subjected to predetermined image processing to be described later, and thereafter applied to a photosensitive drum 210.

Provided at the peripheral area of the photosensitive drum 210 are a primary charger 212, a developing unit 221, a transfer charger 218, a cleaning unit 216 and a pre-exposure lamp 214. In an image forming unit 226, the photosensitive drum 210 is rotated by an unrepresented motor in the direction indicated by an arrow in FIG. 2. After it is charged to a predetermined potential by the primary charger 212, the laser beam 229 radiated from an exposure control unit 220 is applied to form a latent image. This latent image formed on the photosensitive drum 210 is developed by the developing unit 221 and visualized as a toner image.

A transfer sheet transported from an upper cassette 231 or lower cassette 232 via pickup rollers 233 and 234 is fed to the inside of the apparatus via paper feed rollers 235 and 236, and onto a transfer belt by a register roller 237 so that the visualized toner image is transferred to a transfer sheet by the transfer charger 218. After this image transfer, residual toner on the photosensitive drum is cleaned with the cleaning unit 216 and residual charges are removed with the pre-exposure lamp 214.

After the image transfer, the transfer sheet is separated from the transfer belt 230, and the toner image is again charged with pre-fixation chargers 239 and 240. The transfer sheet is fed to a fixing unit 241 to fix the toner image upon application of pressure and heat and discharged from the main frame 200 by a discharge roller 242. A deck 250 capable of accommodating, for example, 4000 transfer sheets is mounted on the main frame 200. A lifter 251 of the deck 250 is raised by an amount corresponding to the number of transfer sheets in order to always abut the transfer sheet against the paper feed roller 252.

A manual multi-feeder 253 capable of accommodating 200 transfer sheets is also mounted. Reference numeral 254 in FIG. 2 represents a paper discharge flapper which switches between a path to a both-side recording side or multi-recording side and a path to a paper discharge side. A transfer sheet transported by the discharge roller 242 is directed by the paper discharge flapper 254 either to the both-side recording side or the multi-recording side.

Reference numeral 258 represents a lower transport path which turns upside down a transfer sheet transported by the paper discharge roller 242 by using a reverse path 255 and introduces it to a paper re-feed tray 256. At this time, although not shown in FIG. 2, in order to align transfer sheets stacked upon the paper re-feed tray 256, two regulate plates are provided for regulating the positions of transfer sheets both in the transport direction and the vertical direction. These regulate plates are retracted to the position in order not to disturb the transport of a transfer sheet to the paper re-feed tray 256 which stacks the transfer sheet thereon. After the transfer sheet is stacked upon the paper re-feed tray 256, these two regulate plates move to push the ends of transfer sheets and align them until the next transfer sheet is transported to the paper re-feed tray 256. Thereafter, the two regulate plates are retracted to the position not disturbing the transport of the next transfer sheet to the paper re-feed tray 256.

Reference numeral 257 represents a multi-flapper for switching between the path to the both-side recording and the path to the multi-recording. As this multi-flapper is turned to the left, a transfer sheet is directly introduced to the lower transport path 258 without passing the reverse path 255. Reference numeral 259 represents a paper feed roller for feeding a transfer sheet via a path 260 to the photosensitive drum 226 side. Reference numeral 261 represents a discharge roller for discharging a transfer sheet directed toward the discharge side by the paper discharge flapper 254, to the outside of the apparatus.

For the both-side recording (both-side copy) or multi-recording (multi-copy), the paper discharge flapper 254 is raised to transport a copied transfer sheet via the transport paths 255 and 258 to the paper re-feed tray 256. For the both-side recording, the multi-flapper 257 is turned to the right, whereas for the multi-recording, the multi-flapper 257 is turned to the left. The transfer sheets loaded in the paper re-feed tray 256 are sequentially transported, starting from the bottom sheet, by a paper feed roller 259 to the register roller 237 via the path 260.

In order to reverse and discharge a transfer sheet from the apparatus, the paper discharge flapper 254 is raised and the flopper 257 is turned to the right. In this case, the copied transfer sheet is transported to the transport path 255 side, and to the second feed roller side by the reverse roller 263 after the end of the transfer sheet passes a first feed roller 262, and reversed by the paper discharge roller 261 and discharged to the outside of the apparatus.

FIG. 3 shows the console unit of the image forming apparatus of the invention.

In FIG. 3, reference numeral 351 represents a ten key used for setting the number of transfer sheets to be formed with images, entering the number of a mode to be set, and the like. Reference numeral 352 represents a clear/stop key used for clearing the set number of transfer sheets to be formed with images, stopping an image forming operation, and the like. Reference numeral 353 represents a reset key used for resetting the set number of transfer sheets to be formed with images, the set operation mode, the selected paper feed stage and the like to thereby recover preset values. Reference numeral 354 represents a start key which is depressed for starting an image forming operation.

Reference numeral 369 represents a display panel made of a liquid crystal panel or the like which changes the display contents in accordance with a set mode in order to facilitate minute setting of a mode. In this embodiment, a cursor on the display panel 369 is moved by using cursor keys 366 to 368, and an OK key 364 is used for acknowledging the final setting. These settings may also be realized by using a touch panel.

Reference numeral 371 represents a paper type setting key used when an image is formed on a thicker recording sheet than a standard sheet. When a thick sheet mode is set with the paper type setting key 371, an LED 370 is turned on. In this embodiment, only the thick sheet mode can be set. If necessary, an OHP mode, a specific sheet mode, and the like may be set to extend the functions of the apparatus.

Reference numeral 375 represents a both-side mode setting key. For example, this key can set four types of modes including: a "one-one mode" for performing a single output from a one-side original, a "one-both mode" for performing a both-side output from a one-side original, a "both-both mode" for performing a both-side output from a both-side original, and a "both-one mode" for performing two one-side outputs from a both-side original. LEDs 372 to 374 turn on in accordance with the set mode. For the "one-one mode", all LEDs 372 to 374 turn off. For the "one-both mode", only LED 372 turns on. For the "both-both mode", only LED 373 turns on, and for the "both-one mode", only LED 374 turns on.

FIG. 4 is a block diagram showing the structure of the image forming apparatus of the invention.

Referring to FIG. 4, an image reading unit 401 is constituted of a CCD sensor 209, an analog signal processing unit 402 and the like. An original image focussed on the CCD sensor 209 via the lens 208 is converted into an analog electrical signal by the CCD sensor 209. The converted image information is supplied to the analog signal processing unit to be subjected to sample/hold, dark level correction and the like and thereafter analog/digital converted (A/D conversion).

The converted digital signal is subjected to shading correction (correction for a variation of a sensor which reads an original and correction for the illumination characteristics of an original illuminating lamp) and variable magnification process, and thereafter input to an electronic sorter unit 403. An external I/F processing unit 409 develops image information input from an external computer and supplies it as image data to the electronic sorter unit 403. The electronic sorter unit 403 performs correction necessary for output systems such as gamma correction, smoothing, edge emphasis, and other image processing, and thereafter outputs the processed image signal to a printer unit 404.

The printer unit 404 is constituted, as described with the cross sectional view of FIG. 2, of the exposure control unit 220 made of a laser and the like, the image forming unit 226, a transfer sheet transport control unit and the like, and records an image on a transfer sheet in accordance with an input image signal. A main control circuit unit 520 is constituted of a CPU 406, a ROM 407, a RAM 408 and the like, controls the image reading unit 401, electronic sorter unit 403, printer unit 404 and the like to thereby control the whole sequence of the apparatus.

Next, the image forming apparatus of this invention will be described, the image forming apparatus having the above-described structure and mounted with a serial I/O control unit (SIOC).

SIOC 521 is made of a single high performance communication control chip integrated on which are a CPU, a ROM, a RAM, an interrupt controller, a bus interface, a serial channel interface, and a stepping motor controller. FIG. 1 shows the image forming apparatus 200 shown in FIG. 2 with such SIOC 521 mounted thereon. SIOC 521 performs a communication by one of two communication modes, when the stepping motor is driven. One communication mode is an automatic phase pattern switching mode which is routinely performed, and the other communication mode is an external trigger mode which is activated upon generation of a trigger pulse by CPU 406.

Referring to FIG. 1, SIOC 521 is connected via a bus interface to CPU 406 mounted on the main control circuit unit 520, notifies CPU 406 of a status of an input load, and drives an output load upon instruction from CPU 406.

SIOC 521 is connected via serial lines to serial node units 501 to 509. The serial node unit 501 is a paper feed control unit 501 for the feed control of a transfer sheet in the cassette 231, and includes an output serial node 510 and an input serial node 511. The output serial node 510 is connected to a driving clutch of the paper feed roller 235, a driving solenoid of the pickup roller 233, a driving clutch of a paper lifter (not shown) of the cassette 231, and a transport path driving clutch near at the paper feed roller.

The input serial node 511 is connected to a sensor which detects a paper presence in the cassette 231, a sensor which detects the upper surface of a transfer sheet to control the paper lift of the cassette 231, and a sensor which detects a transfer sheet on the transport path after the paper feed roller.

Reference numerals 502 and 503 represent a paper feed control unit similar to the paper feed control unit 501, the unit 502 being a unit for controlling the paper feed of the cassette 232 and the unit 503 being a unit for controlling the paper feed of the deck 250. These units 501 to 503 are made of modules which are connected to each paper feed stage.

Reference numeral 504 represents a driving unit for controlling a regulate plate which regulates (alings) the lateral direction of a transfer sheet in the both-side tray 256. This unit 504 includes an output serial node 512 and an input serial node 513. The output serial node 512 is connected to a stepping motor of a four-phase two-excitation driving type which drives the regulate plate. The input serial node 513 is connected to a sensor for detecting the position of the regulate plate.

Figure 5:
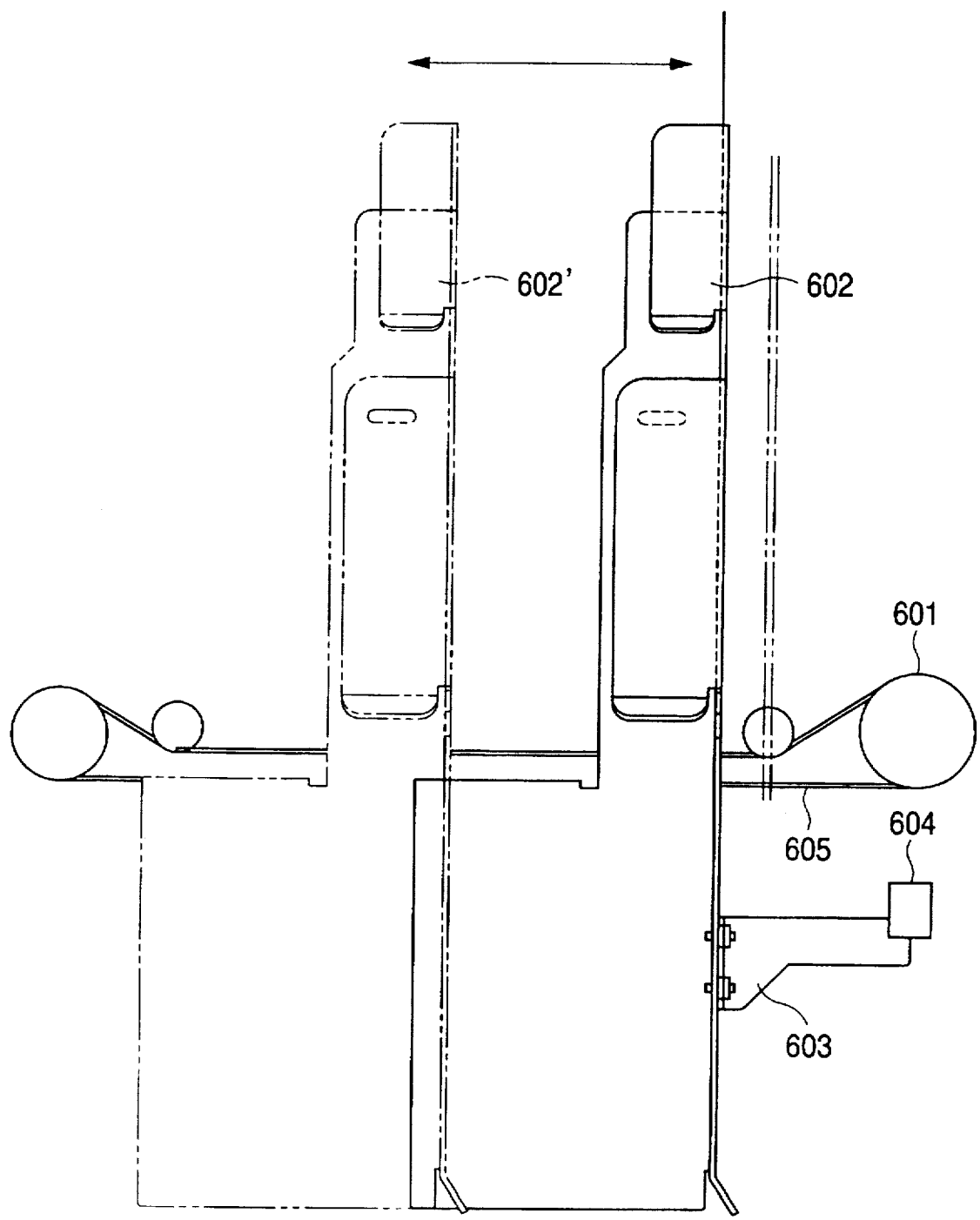
FIG. 5 is a diagram showing the structure of a both-side regulate plate of the image forming apparatus of the embodiment.

A relationship between the regulate plate and the position detecting sensor will be described with reference to FIG. 5 which is a plan view of the both-side tray 256. As shown in FIG. 5, a regulate plate 602 is moved in the direction indicated by a double-head arrow shown in FIG. 5 by a driver belt 605 driven with a stepping motor 601. The regulate plate 602 shown in FIG. 5 is at the position for a largest paper width, and the regulate plate 602' is at the position for a smallest paper width. A flag 603 for position detecting is mounted on the regulate plate. A position detecting sensor 604 is fixed to the both-side tray 256. The position detecting sensor 604 is so positioned that it can detect the state of the regulate plate 602 moved to the position expanded by 10 mm from the largest paper size which the image forming apparatus can handle with. The stepping motor 601 is driven without using a strobe signal, in an automatic phase pattern switching mode using an internal timer of SIOC. This automatic phase pattern switching mode is used for the control not requiring a timing precision, such as the control of the regulate plate.

The regulate plate 602 is initialized when the image forming operation starts. It is set in such a manner that an interrupt is issued from SIOC 521 to CPU 406 when the position detecting sensor 604 turns on. First, the regulate plate 602 is driven in the open direction in a continuous mode. CPU 406 detects the position of the regulate plate 602 from an interrupt issued from SIOC 521, and sets a host signal constant speed step setting register and a host signal deceleration setting register both provided for emergency stop in SIOC 521 to thereby set an emergency stop host signal. In this case, the stop position is set to a position moved by 10 pulses from the sensor ON position. The above two registers may be set before the stepping motor driving start.

Thereafter, it is set in such a manner that an interrupt representative of a change in the data received from a sensor is issued from SIOC 521 to CPU 406 at the position where the sensor turns off. CPU 406 judges the position where the sensor turns off, from the interrupt issued by SIOC 521. CPU 406 sets the host signal constant speed step setting register and the host signal deceleration setting register provided for emergency stop in SIOC 521 to such values as cause the regulate plate to move to the position 10 mm inside of the lateral width of stacked sheets, to thereby set the emergency stop host signal.

When sheets are stacked on the both-side tray 256, a constant speed setting mode is selected in an internal timer automatic phase pattern switching mode. When sheets are stacked on the both-side tray 256, the regulate plate 602 is once closed to the sheet width position and then it is again opened to the position 10 mm outside of the sheet lateral width.

Returning back to FIG. 1, reference numeral 505 represents a driving unit for driving the register roller. This unit 505 includes an output serial node 514 and an input serial node 516. The output serial node 514 is connected to a driving clutch of the register roller 237. The input serial node 515 is connected to a sensor which is disposed before the register roller and detects the timing of the register roller. Reference numeral 506 represents a fixation driving unit which includes an output serial node 516 and an input serial node 517. The output serial node 514 is connected to a driving clutch for the fixing unit roller and a driving solenoid for winding a stain removing web of the fixing roller, and the input serial node 515 is connected to a fixing input port sensor and a fixing output sensor.

These two sensors detect a jam at the fixing unit, and judge the timing of stopping the fixing roller when a jam occurs at the area other than the fixing unit. Reference numeral 507 represents a reverse discharge driving unit which includes an output serial node 518 and an input serial node 519. The output serial node 518 is connected to driving solenoids for the path switching flappers 254 and 257 and driving direction switching CLs for the reverse rollers 262 and 263. The input serial node 519 is connected to an inner discharge sensor mounted between the fixing outer discharge roller 242 and flapper 254, to an outer discharge sensor at the outside of the outer discharge roller and to a reverse sensor for detecting the reverse timing when a transfer sheet is reversed and discharged. Each clutch or solenoid is controlled in accordance with a timing detected with the corresponding sensor.

Reference numerals 508 and 509 represent scanning driving controlling units for optical units. The unit 508 is an input serial node for detecting the position of the optical scanner 202, and is connected to a home position sensor for detecting the home position of the optical scanner 202, to an image top sensor for detecting the image exposure start position, and to a shading position detecting sensor for judging whether the optical sensor is at the position capable of shading.

The unit 509 is a stepping motor for scanning and driving the optical scanner 202. This stepping motor 509 is a 5-phase motor and drives a stepping motor driving pattern from SIOC 521 in 5-phase 2–3 excitation. The stepping timing mode of SIOC 521 is set to the external trigger mode in which the phase pattern is switched synchronously with a trigger pulse from CPU 406. CPU 406 sets SIOC 521 so that an interrupt is generated upon detection by the image top sensor. By receiving an interrupt at the image top, the frequency and number of trigger pulses are controlled. The external trigger mode is used for the control which requires a precise timing control such as scanner control.

The sensor input value received at each input serial node of the units 501 to 508 is read twice by SIOC 521, and if the two values are the same, this value is notified to CPU 406. Generally, SIOC 521 operates to always monitor and read the sensor value of each sensor at a predetermined timing and decide whether an interrupt is issued to CPU 406, and operates to read the sensor value designated by CPU 406 and notify it to CPU 406 in response to a read request from CPU 406. The sensor of the transport path is read when CPU 406 requests, in addition to at the predetermined timing described above.

The detailed description of SIOC 521 will be given with reference to FIG. 6.

Figure 6:
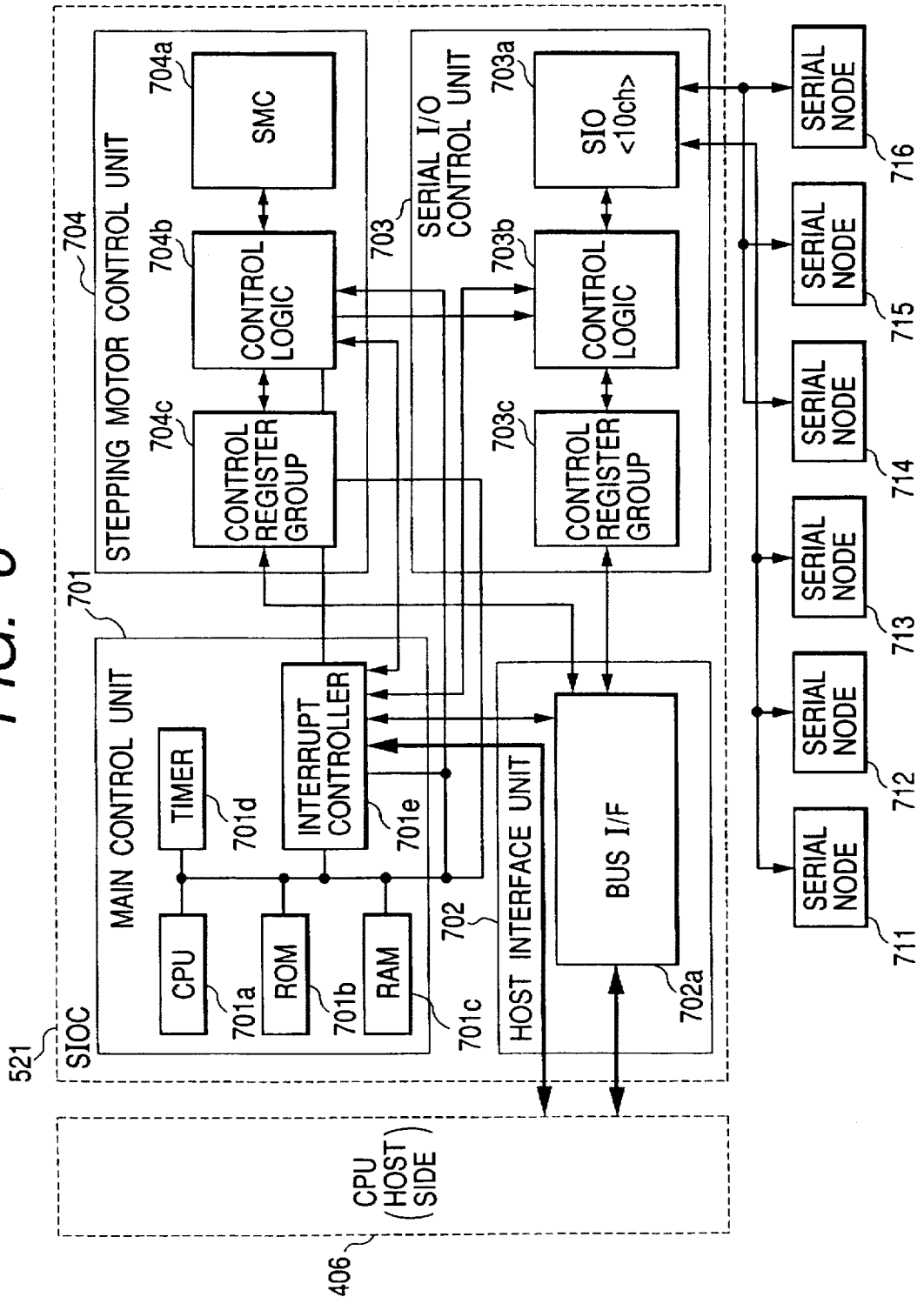
FIG. 6 is a diagram showing the structure of a serial I/O control unit (SIOC).

As shown in FIG. 6, SIOC as a high performance communication control chip is constituted of a main control unit 701 for controlling internal devices, a host interface unit 702 for the interface with CPU 406 (host), a serial I/O control unit 703 for communication control, and a stepping motor control unit 704 for the control of the stepping motor. SIOC 521 is connected via the serial I/O control unit 703 to input serial nodes 711 to 713 made of sensor logic ICs for the connection to sensors and the like, and to output serial nodes 714 to 716 made of pre-driver ICs for the connection to an electromagnetic clutch, stepping motor and the like.

The constituent elements of SIOC will be sequentially described hereinunder.

The main control unit 701 is constituted of a CPU 701a, a ROM 701b, a RAM 701c, a timer 701d, and an interrupt controller 701e for the internal control of other control units to be described later and for the control of the host CPU 406 via the host interface unit 702.

The host interface unit 702 is constituted of a bus interface 702a and the like including address buses, data buses and control buses for the interface with other control units and CPU 406. The address width is 10 bits, and the data width is switchable between 8 bits and 16 bits. The host interface unit 702 is provided with a conflict arbitration function for the arbitration when a controller internal resource and the host 406 access the same address, and other functions.

Next, the serial I/O control unit 703 will be described.

The serial I/O control unit 703 is constituted of ten serial I/O (SIO) channels 703a each having the same structure, a baud rate generator 703b and a control register group 703c for the communications with the host 406. The serial channel 703a performs half-duplex communications with a two-wire structure of clocks (SCK) and data (SDT). The data is transmitted and received in the unit of 8 bits, and the baud rate is 1 Mbps at a maximum.

The distance between nodes is 1 m at a maximum, and the distance between the serial I/O controller (SIOC) 521 to the last node is 2 m at a maximum. Three addresses per one channel can be assigned at a maximum. A node up to 8 bits can be connected to each address. Each channel has a transmission buffer, a reception buffer, six control registers (including: a serial mode register (SCnMOD); a serial command register (SCnCMD); a serial interrupt mask register (SCnINT); a serial status register (SCnSR); a serial connection check result register; and a baud rate control register), three transmission data registers, and three reception data registers. The transmission and reception registers are in one-to-one correspondence with addresses of each node. Each channel has a serial interrupt generation channel register of total 16 bits. The details of each register will be given later.

The communication format of the serial I/O control unit 703 is as follows. Communication modes are all based on the format shown in FIG. 7. The meaning of each bit of the format may differ depending upon each communication mode. In the case of a reset mode and a connection check mode, the frame shown in FIG. 7 is repeated twice, one frame being constituted of 17 clocks and transferring data of 8 bits.

Figure 7:
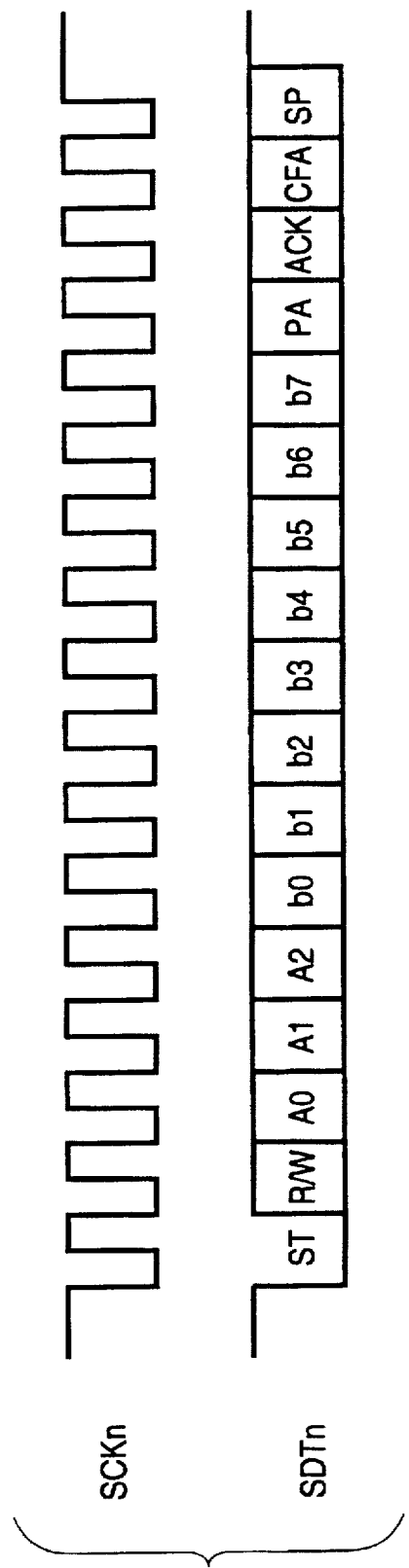
FIG. 7 is a diagram showing the communication format of SIOC.

ST in FIG. 7 is a bit for notifying a start of a start condition bit frame, which indicates a frame start when it takes "0". R/W represents a communication direction and designates a communication mode together with the succeeding bits A0, A1 and A2. In a normal mode, this bit indicates either a reception or a transmission, "0" for transmission and "1" for reception. A0, A1 and A2 are address bits (3 bits) and designate a communication mode when used with R/W. This designation is as shown in FIG. 8.

b0 to b7 in FIG. 7 are data bits (8 bits), the data bit taking 8 bits irrespective of the number of bits of a connected node. Data is transmitted sequentially starting from the node test from the controller, and data is input sequentially from the node nearest to the controller. These bits take "FF" for the reset mode and connection check mode. PA is a parity bit which is used during a normal mode to check whether the communication data is correct or not, and is an even parity. Only the node at the remotest end among the nodes having the same address calculates the parity. This parity is sent from the controller to the node for data transmission, and from the node to the controller for data reception. This parity is "1" in the reset mode and connection check mode.

ACK is an acknowledge bit which is used for the node to notify the serial controller of whether or not the received data generates a parity error. Similar to the parity bit, only the node at the remotest end among the nodes having the same address detects the parity error, and it is necessary to notify the other nodes with the same address of the acknowledge. This is notified by using the last stop bit SP. This ACK bit takes "1" in the reception mode, reset mode and connection check mode. "0" indicates no parity error and "1" indicates a parity error.

CFA is a dummy bit to be saved in a data collision avoiding bit. SP is a bit indicating an end of a stop bit frame, and also indicating a generation of a parity error in the normal communication mode. "0" indicates a generation of a parity error in the transmission frame, and "1" indicates a frame normal end.

The communication modes includes four modes including a transmission mode, a reception mode, a connection check mode and a reset mode. These modes (A) to (D) will be described.

(A) Transmission Mode

For data transmission, a transmission permission bit (TXE) of a serial command register (SCnCMD) is set to "1". When data is written in the serial transmission data register (SCnTDT) in this state, the data transmission starts. Once a transmission permission bit (TXE) is set to "1", it remains "1" until it is cleared to "0". Therefore, after "1" is once set, data transmission becomes possible only if data is written in the serial transmission data register (SCnTDT). However, if data of the previous data transmission is left in the transmission buffer, the data transmission waits until the previous data transmission is completed.

Since the double-buffer structure is used, as data is transferred from the serial transmission register (SCnTDT) to the transmission buffer, a transmission interrupt is generated. At this time, a transmission empty bit of the serial status register (SCnSR) is set to "1", and it is cleared to "0" when read. The transmission interrupt can be masked by setting "0" to a transmission interrupt permission bit (INTTX) of the serial interrupt mask register (SCnINT).

The node calculates a parity (even parity) of the transmission data, and if the calculated parity has the same value as the parity bit received from the controller, returns the ACK bit "0" to the controller. If the parities are not the same, the ACK bit "1" is returned. In accordance with the ACK bit, the controller judges whether a parity error is generated.

If the parity error is not generated, the stop bit "1" is transmitted, whereas if an error occurs, the stop bit "0" is transmitted. In the case of a parity error, if a retry control bit (RSTRT) of the serial mode register (SCnMOD) is "0", an error interrupt is generated at the end of the frame to set a parity error bit (PERR) of the status register to "1", whereas if the retry control bit (RSTRT) is "1", the data is again transmitted. If a parity error is generated also at the second data transmission, an error interrupt is generated at the end of the frame and the parity error bit of the status register is set to "1".

(B) Reception Mode

The reception mode includes a single mode of receiving data once and a repeat mode of continuously receiving data. In both the nodes, data reception starts by designating a reception address by using an address control bit of the serial mode register and thereafter setting a reception permission bit (RXE) of the serial command register (SCnCMD) to "1".

In the single mode, the reception permission bit (RXE) is cleared to "0" when the data reception is completed. In the repeat mode, it remains "1" until "0" is written. After "0" is written in this bit and when the reception under operation is completed, the communication is terminated.

Switching between the single mode and the repeat mode is controlled by a reception repeat control bit (RPT) of the serial mode register. The single mode is set when this bit is "0" and the repeat mode is set when this bit is "1". After the reception of one address is completed, a reception interrupt is generated and a reception end bit at the first bit of the status register is set to "1" and cleared to "0" when read. The reception interrupt can be masked by setting "0" to a reception interrupt permission bit (INTRX) of the serial interrupt mask register (SCnINT).

The controller calculates a parity (even parity) of the reception data, and compare. If the parities parity. If the parities are the same, the reception data is written in a serial reception data register m−1 (SCnTDT m−1) to generate a reception interrupt, and a reception end bit of the serial status register (SCnSR) is set to "1". If the parities are different and the retry control bit (RSTRT) of the serial mode register (SCnMOD) is "0", the parity error bit is set to "1" and an error interrupt is generated.

If the parities are different and the retry control bit is "1", the data is again received. If the parities are the same as the second data reception, the reception data is written in the serial reception data register m−1 (SCnTDT m−1) and a reception interrupt is generated and a reception ready bit is set to "1". If the parities are not the same even at the second data reception, the parity error bit is set to "1" and an error interrupt is generated. At this time, a reception end bit is set to "1".

(C) Connection Check Mode

The connection check mode is a mode used for checking whether serial communication lines are correctly connected. In order to perform this mode, first an address is designated by using the serial interrupt register, and then a connection check bit of the serial command register (SCnCMD) is set to "1". Upon setting this connection check bit, the connection check sequence is performed. After the completion of the connection check sequence, a connection end bit of the status register is set to "1" to generate a connection check end interrupt and the connection results are indicated by a connection check result bit of the status register. An abnormal address and bit information are indicated by the serial check register and result register. Since communication is serial, the serial communication lines are checked sequentially starting from the line nearest to the controller. When an abnormal status is found at the first time, the connection check result bit of the status register is set to "1" to terminate this sequence. During this sequence, a communication latch at each node is disconnected from a sensor and a driver so that a so-called loop check can be performed which receives the transmitted data itself.

(D) Reset Mode

The reset mode is a mode of resetting a communication latch and a communication counter at the node. A reset code is transmitted when a reset bit (RST) of the serial command register (SCnCMD) is set. The reset mode is performed by using the same frame twice. Such operations are performed in order not to erroneously enter the reset mode which is a special mode.

Next, the description will be given for two-value comparison, dummy count, baud rate, error, and interrupt.

(E) Two-value Comparison

The two-value comparison is a mode in which reception continues until the same value is consecutively received twice and at this time the reception data is written in the register and a reception end interrupt is generated. For this mode, a two-value comparison control bit of the serial mode register is set to "1". By using this mode, it is not necessary for the host side to perform two-value comparison so that a load of the host CPU can be reduced.

(F) Data Change Detection Control

The data change detection control is a mode in which data to be received and written in the register is compared with data (preceding data) already received and written in the register, and if there is a change in the data, an interrupt is issued to CPU (host). In this case, a bit at the corresponding address of the status bit is set to "1". This interrupt can be masked by setting "0" to a reception data change interrupt permission bit of the serial interrupt mask register (SCnINT). By using this function, it becomes unnecessary for the host side to always monitor a change in data so that a load of the host CPU can be reduced.

(G) Dummy Count

Sensor logic and driver logic has a built-in communication counter. If the count is shifted by noises, a clock is forcibly entered to overflow this counter. To this end, the dummy count is used. The dummy count is performed by setting a dummy count control bit of the serial mode register (SCnMOD) to "1" when a parity error is generated, to thereby generate and enter 16 dummy clocks before the next communication frame.

(H) Baud Rate

A baud rate of 1 Mbps at a maximum can be realized by setting a baud rate generator controller register.

(I) Error

The sensor logic or drive logic checks a parity during data transmission and notify this check result to the controller. During data reception, the controller checks the parity. If a parity error is generated, a parity error interrupt is generated at the end of the frame, and the parity error bit of the status register is set to "1". This interrupt can be masked by setting "0" to a parity error interrupt permission bit (INTPER) of the serial interrupt mask register (SCnINT). If the retry control bit of the serial mode register (SCnMOD) used for the error case has been set to "1", communications automatically restart when a parity error is generated. In this case, if a parity error is generated even at the second communication, then for the first time a parity error interrupt is generated and the parity error bit of the status register is set to "1".

(J) Interrupt

Each channel has five types of interrupts including: a transmission empty interrupt, a reception end interrupt, a connection check end interrupt, a parity error generation interrupt, and a reception data change occurrence interrupt. When each interrupt is generated, the corresponding bit of the status register of each channel is set to "1". When the status register and interrupt channel generation register are read, they are cleared to "0". Since there is only one interrupt relative to the host, the interrupt generation channel register and status register are called to judge the corresponding channel and interrupt cause. Whether an interrupt is generated to the host for each interrupt cause, can be masked by the serial interrupt mask register (SCnINT).

The interrupt generation timings will be described. When data is written from the transmission data register into the transmission buffer, a transmission empty interrupt (a) is issued, when a reception frame is completed, a reception end interrupt (b) is issued, when a connection check is completed, a connection check end interrupt (c) is issued, when a transmission frame and reception frame are completed, a parity error interrupt (d) is issued, and when a reception frame is completed, a reception data change occurrence interrupt (e) is issued.

The functions of settings of the control register group 703c will be described in detail.

The control register group may include a serial mode register (SCnMOD), a serial command register (SCnCMD), a serial interrupt mask register (SCnINT), a serial status register (SCnSR), a baud rate generator control register (BRnCR), a serial connection check result register, a serial interrupt generation register (SCINTCH0/1), and serial transmission and reception registers (SCnTDT, SCnRDT).

(A) Serial Mode Register (SCnMOD)

With this register, the following settings are possible.

(a) A reception repeat control bit (RPT) designates whether reception is repeated or not. In order to release the repeat setting, this bit is set to "0" or the reception permission bit is set to "0".

(b) A twice-read establishing bit (CMP) can designate in a reception mode whether reception is repeated until the same value is consecutively read twice. If this bit is "0", the twice-read is inhibited, whereas if this bit is "1", the twice-read is established.

(c) A reception bit change detection control bit (CHG) is used for comparing present reception data with previous reception data to check whether there is any change in the data. If there is a change, the status register is set to "1", and if there is an interrupt permission, an interrupt is issued.

(d) A dummy count control bit (DMCNTE) can designate whether a dummy count is entered in a communication frame. If this bit is "0", the dummy count is inhibited, whereas if this bit is "1", the dummy count is permitted. Inserting a dummy count can correct a shift in the communication counter built in the serial I/O node to be described later.

(e) A retry control bit (RSTRT) used for the error case can designate a retry of communications when a parity error occurs. If this bit takes "0", it means a retry inhibition, and if "1", it means a retry permission. In the case of retry permission, communications can be automatically performed once when a parity error occurs. If a parity error occurs again after the retry, a parity error bit to be described later is set and an error interrupt to be described later is generated to terminate the communications.

(f) An address control bit (AD2/AD1/AD0) designates whether reception is performed at each address. If the repeat mode is designated, reception is sequentially performed at addresses set with "1". This bit is not related to transmission because each address is determined depending upon in which serial transmission data register (SCnTDT) data was written.

(B) Serial Command Register (SCnCMD)

With this register, the following controls are possible.

(a) A transmission permission bit (TXE) controls permission/inhibition of transmission. If this bit is set to "1", it continues to take "1" until it is set to "0". If this bit is "1" and when data is written in the serial transmission data register, transmission starts. If data is written in the serial transmission data register before this bit is set to "1", transmission starts when this bit is set to "1". Transmission has a priority over reception so that if data is written in the serial transmission data register during the repeat reception, transmission starts when the reception under operation is completed. After the transmission, the repeat reception resumes.

(b) A reception permission bit (RXE) controls permission/inhibition of reception. If this bit is set to "1", reception starts at an address designated by a reception address designation bit. In the single mode, it is cleared to "0" when the reception is completed. In the repeat mode, it is not cleared to "0" but reception continues sequentially at each address designated by the reception address designation bit. In this case, reception is terminated when this bit is set to "0".

(c) A reset bit (RST) can reset a node. If this bit is set to "1", a frame is transmitted to reset a node. After this reset frame is transmitted, this bit is cleared to "0".

(d) A connection check bit (CHK) is used for checking the connection of a communication line. If this bit is set to "1", a frame is transmitted to make a node enter a connection check mode. After this frame is transmitted, this bit is cleared to "0". In the connection check mode, a node is disconnected once from input and output elements.

(C) Serial Interrupt Mask Register (SCnINT)

With this register, the following status monitors are possible.

(a) A connection address designation bit (CNCT1/CNCT0) designates an address with a connected channel. In a connection check routine, the connection status is checked in accordance with the designated information. "00" indicates only an address 0, "01" indicates an address 0 and an address 1, "10" indicates an address 0, an address 1 and an address 2, and "11" indicates no address.

(b) A reception data change interrupt permission bit (INTUM) designates whether an interrupt is permitted if there is a change in reception data during the reception data change detection. "0" means inhibition and "1" means permission.

(c) A parity error interrupt permission bit designates whether a parity error notice is permitted when a parity error occurs. "0" means inhibition and "1" means permission.

(d) A connection check end interrupt permission bit (INTCHK) designates whether an interrupt notice is permitted when a connection check is completed. "0" means inhibition and "1" means permission.

(e) A reception end interrupt permission bit (INTRX) designates whether an interrupt notice is permitted when reception is completed. "0" means inhibition and "1" means permission.

(f) A transmission end interrupt permission bit (INTTX) designates whether an interrupt notice is permitted when transmission is completed. "0" means inhibition and "1" means permission.

(D) Serial Status Register (SCnSR)

With this register, the following status monitors are possible.

(a) A connection check result bit (CHKRLT) indicates the result of a connection check test. "0" indicates an absence of abnormality and "1" indicates a presence of abnormality.

(b) A data change occurrence bit (UMA2/UMA1/UMA0) notifies that reception data at each address differs from the previous reception data, if a data change detection control bit is "1". "0" means a change and "1" means no change.

(c) A parity error bit (PERR) is used for judging whether a parity error occurred during communication. During the transmission, a node checks the parity and sends an acknowledge signal to the controller. During the reception, the controller checks the parity. "0" means no parity error and "1" means a parity error.

(d) A connection check end bit (CHKEND) indicates a completion of the connection check routine. "1" means a connection check end.

(e) A reception end bit (RxEND) indicates a completion of reception. "1" means a reception end.

(f) A transmission end bit (TxEND) indicates a completion of transmission. "1" means a transmission end.

(E) Baud Rate Generator Control Register (BRnCR)

With this register, the following settings are possible.

(a) An input clock selection bit (BRnCK1/0) can designate a clock used by the baud rate generator. "00" indicates a ¼ clock of the original clock, "01" indicates a ¹⁄₁₆ clock of the original clock, and "10" indicates a ¹⁄₆₄ clock of the original clock.

(b) A frequency division value setting bit (BRnS3/2/1/0) designates a frequency division value used by the baud rate generator. "0000" indicates a division by 16, "0001" indicates a division by 1, "0010" indicates a division by 2, . . . , "1111" indicates a division by 15, with an increment of division by 1.

(F) Serial Connection Check Result Register

With this register, the following points can be confirmed.

(a) A connection error address (CHKA1/0) is an address where abnormality of a communication line was detected by connection check. "00" indicates an address 0, "01" indicates an address 1, and "10" indicates an address 2.

(b) A connection error bit position (CHKB2/1/0) is a bit position where abnormality of a communication line was detected by connection check. "000" indicates a bit 0, "001" indicates a bit 1, "010" indicates a bit 2, "011" indicates a bit 3, "100" indicates a bit 4, "101" indicates a bit 5, "110" indicates a bit 6, and "111" indicates a bit 7.

(G) Serial Interrupt Generation Register (SCINTCH0/1)

With this register, it is possible to confirm which channel generated an interrupt. When the bit of this register is read, it is cleared to "0".

(H) Serial Transmission and Reception Data Registers (SCnTDT, SCnRDT)

The serial transmission data register and serial reception data register are in one-to-one correspondence with the address of a connected node. SCnTDT0 and SCnRDT0 correspond to an address 0, SCnTDT1 and SCnRDT1 correspond to an address 1, and SCnTDT2 and SCnRDT2 correspond to an address 2.

In the following, the stepping motor control unit 704 will be described.

By setting the numbers of steps of the stepping motor to the stepping motor control unit 704, acceleration—constant speed—deceleration can be automatically controlled. The stepping motor control unit 704 also has a function of stopping the motor in response to an input from a sensor, a function of outputting an interrupt signal, and other functions. This unit 704 is also provided with various registers necessary for the hard line input/output of an interrupt signal or for the control of operation modes of the stepping motor. Specifically, as shown in FIG. 6, the stepping motor control unit 704a is constituted of an SMC 704a, a control logic 704b and a control register group 704c. It is possible to output pattern data generated by the control unit 704 to a serial channel via the serial I/O control unit 703. The details of the stepping motor control unit 704 will be given hereinunder.

The main features are enumerated as in the following. (a) It is possible to set phase excitation from 4-phase 1-excitation to 5-phase 2–3-excitation. (b) It is possible to realize a full automatic operation by setting the numbers of steps of acceleration—constant speed—deceleration. (c) It is possible to select either a trigger signal from an internal timer or an external input (capable of a double speed). (d) It is possible to set a rotation direction of phase data. (e) It is possible to set all OFF outputs. (f) It is possible to set an operation after stop by using a sensor input. (g) It is possible to read a trigger counter. (h) It is possible to confirm the status of the stepping motor controller (SMC) under operation. (i) A function is provided which outputs an interrupt at each end of acceleration, constant speed, and deceleration and at a count timer coincidence. (j) There are provided acceleration and deceleration trigger timer registers of eight stages which can be rewritable at any time by using a conveyer signal output.

Figure 9:
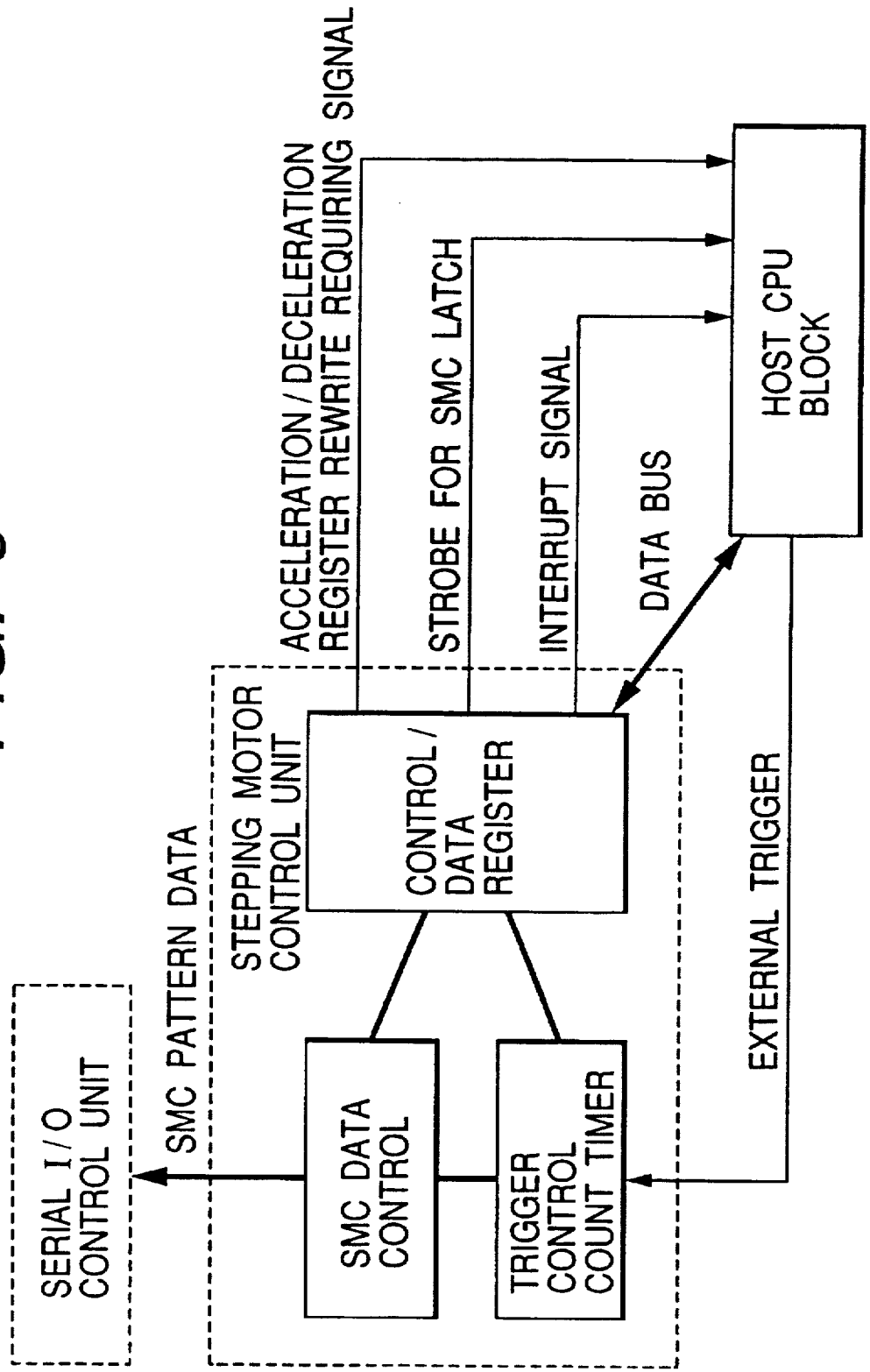
FIG. 9 is a diagram showing in block form a stepping motor control unit of SIOC.

FIG. 9 shows a conceptual block diagram of the stepping motor control unit. The basic operation or phase excitation patterns can be set by bits 0 to 3 of a first control register (CTR 1). The details thereof are given in FIG. 10. In the case of 4-phase data, the phase data is required to be set either on the MSB (upper) side or on the LSB (lower) side of a pattern table (refer to FIG. 12).

For the pattern switching control, either a trigger generated by an internal 16-bit timer or an external trigger can be selected by setting bits 4/5 of the first control register (CTR1). The details thereof are given in FIG. 11. For automatic control, a trigger generated by a 16-bit timer is used. In this case, an output of a strobe signal for an external phase pattern latch circuit can also be controlled.

For phase data rotation direction control, the set phase pattern can be switched between normal rotation and reverse rotation by setting the bit 6 of the first control register (CTR1). For reversion during operation, the phase data start is reversed at the time when the direction is switched.

For all OFF function, the phase data can be set to a no-excitation state by setting the bit 7 of the first control register (CTR1). Thereafter, the phase excitation pattern starts from the initial state (at step 1 in the pattern table).

For a trigger double speed mode function, it is possible to count both edges of an external trigger at a double speed by setting the bit 3 of a second control register (CTR2). If the internal trigger is used, this setting is made invalid because the count is fixed only to a rising edge.

For a phase data setting function, the pattern data of 5-phase 2-3-excitation at a maximum can be set by using the pattern table (refer to FIG. 12) with 10 steps (10 bytes). In serial transmission, the phase data is transferred from the MSB (bit 7) side. The phase advances from a lower step to a higher step during the normal rotation, whereas the phase advances from a higher step to a lower step during the reverse rotation. As already described there are seven phase excitation patterns settable, including 4-phase 1-excitation, 4-phase 2-excitation, 4-phase 1-2-excitation, 5-phase 1-excitation, 5-phase 2-excitation, 5-phase 1-2-excitation, and 5-phase 2-3-excitation.

For the functions of starting the operation of the stepping motor control unit and confirming its status, the operation of the stepping motor control unit can be controlled by setting the bit 1 of the second control register (CTR 2). This setting means a timer start/stop if the internal timer is used for a trigger, and means a trigger input permission/inhibition if an external trigger is used. By reading this bit, it is possible to confirm the status during the operation. If the read value is "0", the stepping motor control unit is not under operation, whereas if it is "1", the stepping motor control unit is under operation. When "0" is written, the stepping motor control unit stops its operation, whereas when "1" is written, the control unit starts its operation. After the step setting operation is completed, the read value becomes "0".

If a timer trigger is used and all the numbers of operation steps of acceleration—constant speed—deceleration are preset, it is possible to perform a series of stepping motor controls by automatically switching the trigger signal. The numbers of steps can be set to a constant speed setting mode or a continuous constant speed mode by setting the bit 2 of the second control register (CTR 2). For setting the numbers of steps, first and second step setting registers are used. The setting range is 0 to 255 steps for acceleration, 0 to 65535 steps for constant speed setting mode or continuous constant speed mode, and 0 to 255 steps for deceleration.

Figure 13:
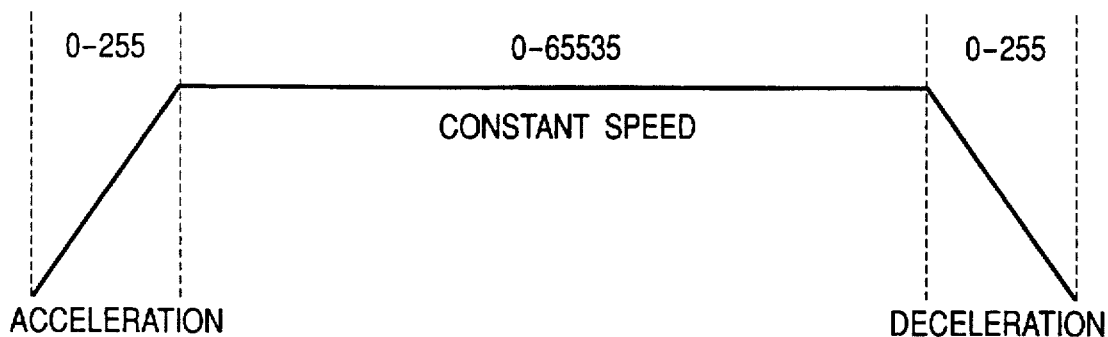
FIG. 13 is a diagram illustrating an example of a constant speed setting mode.
Figure 14:
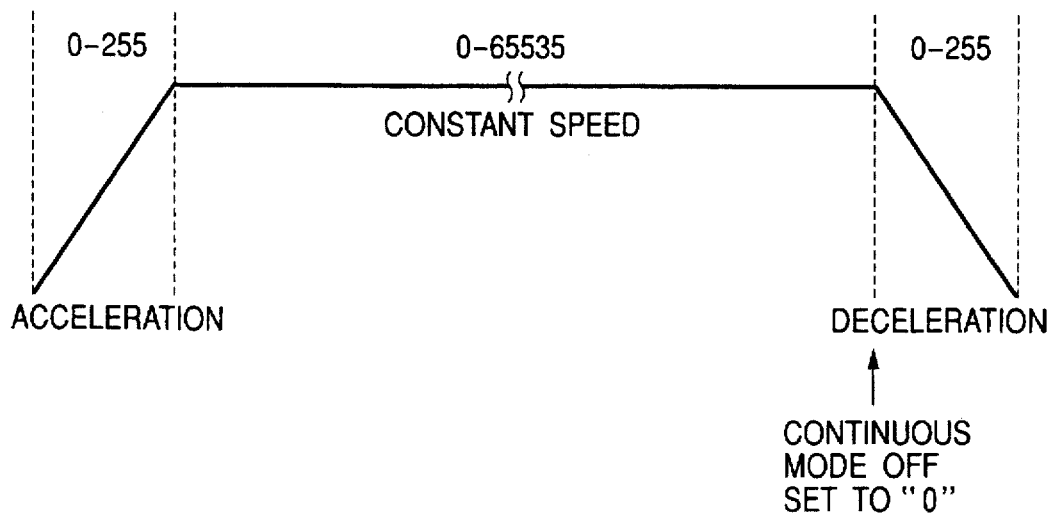
FIG. 14 is a diagram illustrating an example of a continuous constant speed mode.
Figure 15:
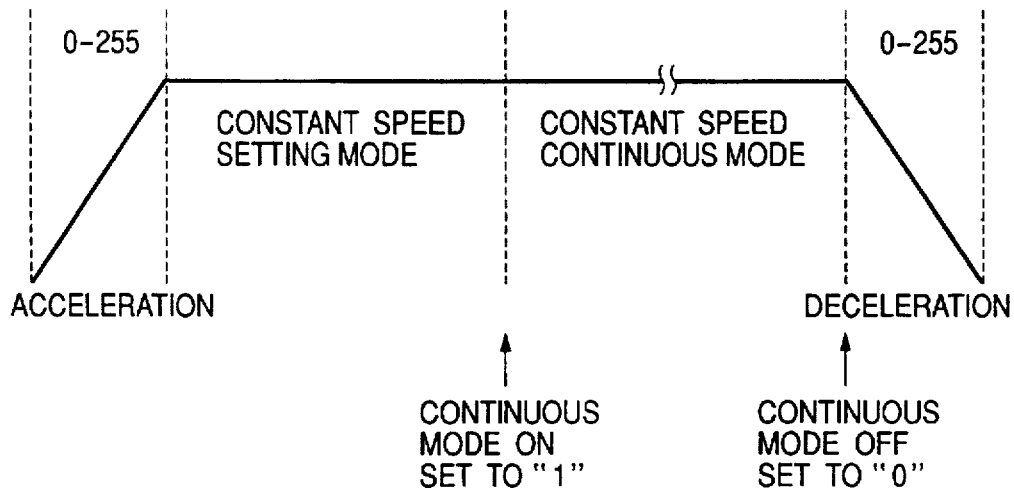
FIG. 15 is a diagram illustrating an example of a mixed mode of a continuous constant speed mode and a continuous mode.

For the constant speed setting mode (refer to FIG. 13), step operations are performed for all of acceleration, constant speed, and deceleration. For the continuous constant speed mode function (refer to FIG. 14), after the acceleration, a constant speed operation continues and thereafter "0" is set to change to the deceleration. For a mixed function of the constant speed setting mode and the continuous constant speed mode (refer to FIG. 15), after the acceleration, a step operation is performed in the constant speed setting mode and then "1" is set to change to the continuous constant speed mode.

For the function of setting an internal 16-bit timer trigger, 16-bit timer registers are provided independently for each of acceleration, constant speed and deceleration, and timer data is set to the registers. The timer register for acceleration and deceleration has 0 to 7 stages, and that for constant speed has one stage. The use start position of the 8 stages of the acceleration or deceleration timer register can be set in units of one stage. A request signal for writing data in the acceleration or deceleration timer register can be output after the conveyance is completed. The number of stages can be selected in accordance with the timings of writing data.

Figure 16:
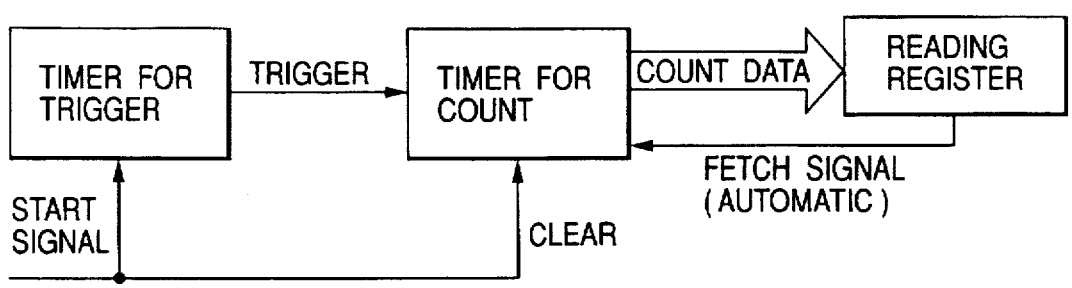
FIG. 16 is a block diagram illustrating an example of reading a step count.

For a step count reading function (refer to FIG. 16), it is possible to read at once the newest value of the step counter under operation, from a step count reading register (STPC L/H). The contents of the register are cleared when the next stepping motor control unit operation starts. For a function of setting a host signal input, it is possible for the host to perform an emergency stop, by setting the bit 0 of the second control register (CTR 2). The stepping motor control unit operation stops when "1" is written and after the steps written in a host signal constant step setting register and a host signal deceleration step setting register are performed. Setting the host signal input is possible even during the continuous constant speed mode. The description of the operation when the sensor position reaches during acceleration or other operations will be given in the following.

Three operation patterns will be described with reference to the accompanying drawings. The three operation patterns are a pattern of a sensor position pass during constant speed operation, a first pattern with a sensor position pass during acceleration (host signal constant speed value 4—remaining acceleration=plus), and a second pattern with a sensor position pass during acceleration (host signal constant speed value 4—remaining acceleration=minus).

Figure 17:
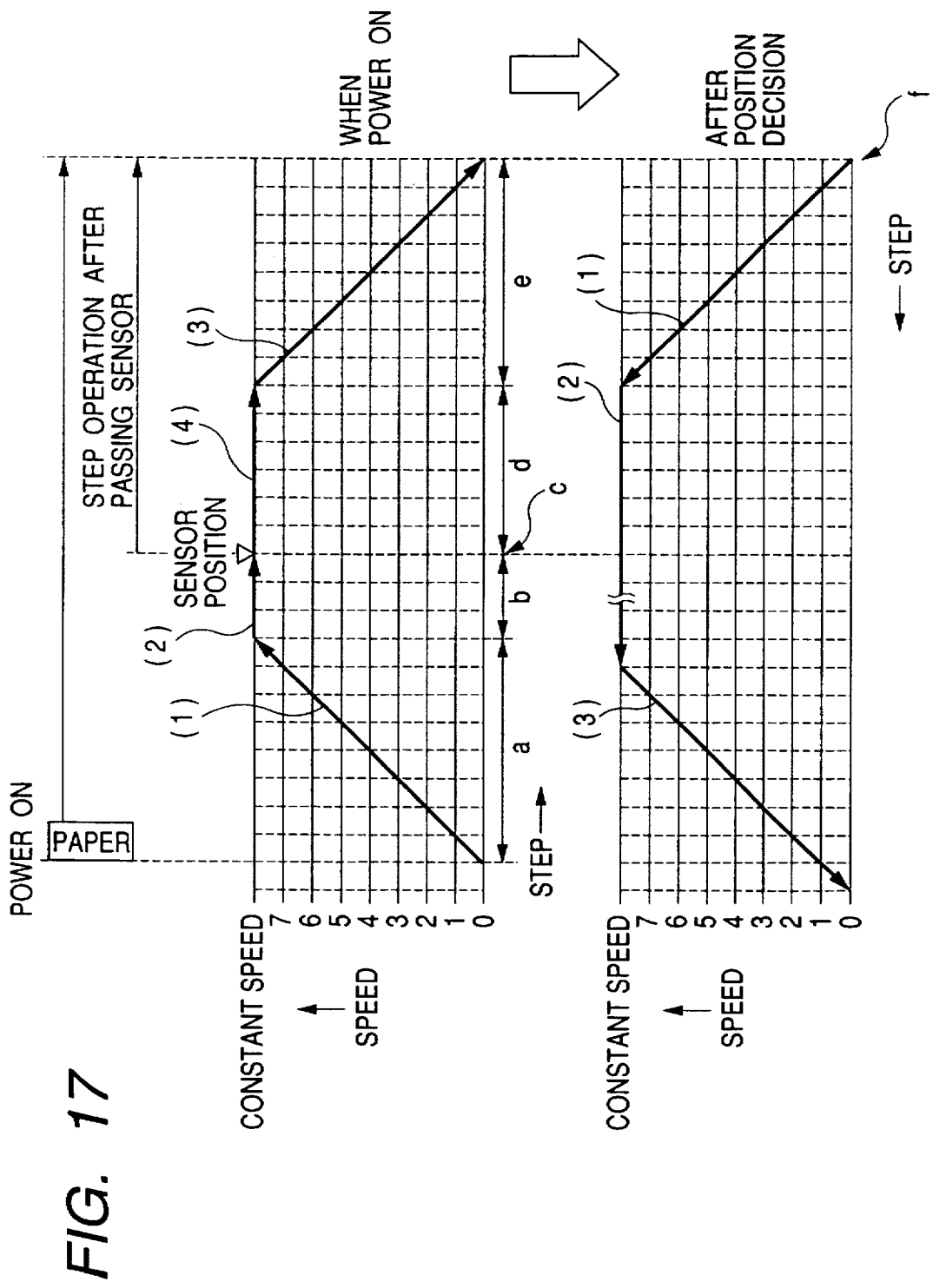
FIG. 17 is a chart illustrating the constant speed operation during which a sensor position is passed.

The operation sequence (refer to FIG. 17) of the pattern of a sensor position pass during constant speed operation is as follows. After a power is turned on, a normal acceleration operation is performed as indicated at (1) in FIG. 17, a normal constant speed operation is performed as indicated at (2) to pass the sensor position. Further, a host signal constant speed operation is performed as indicated at (4) and a normal deceleration operation is performed as indicated at (3) to terminate the operation. After the stop position is confirmed, the normal operation starts.

Figure 18:
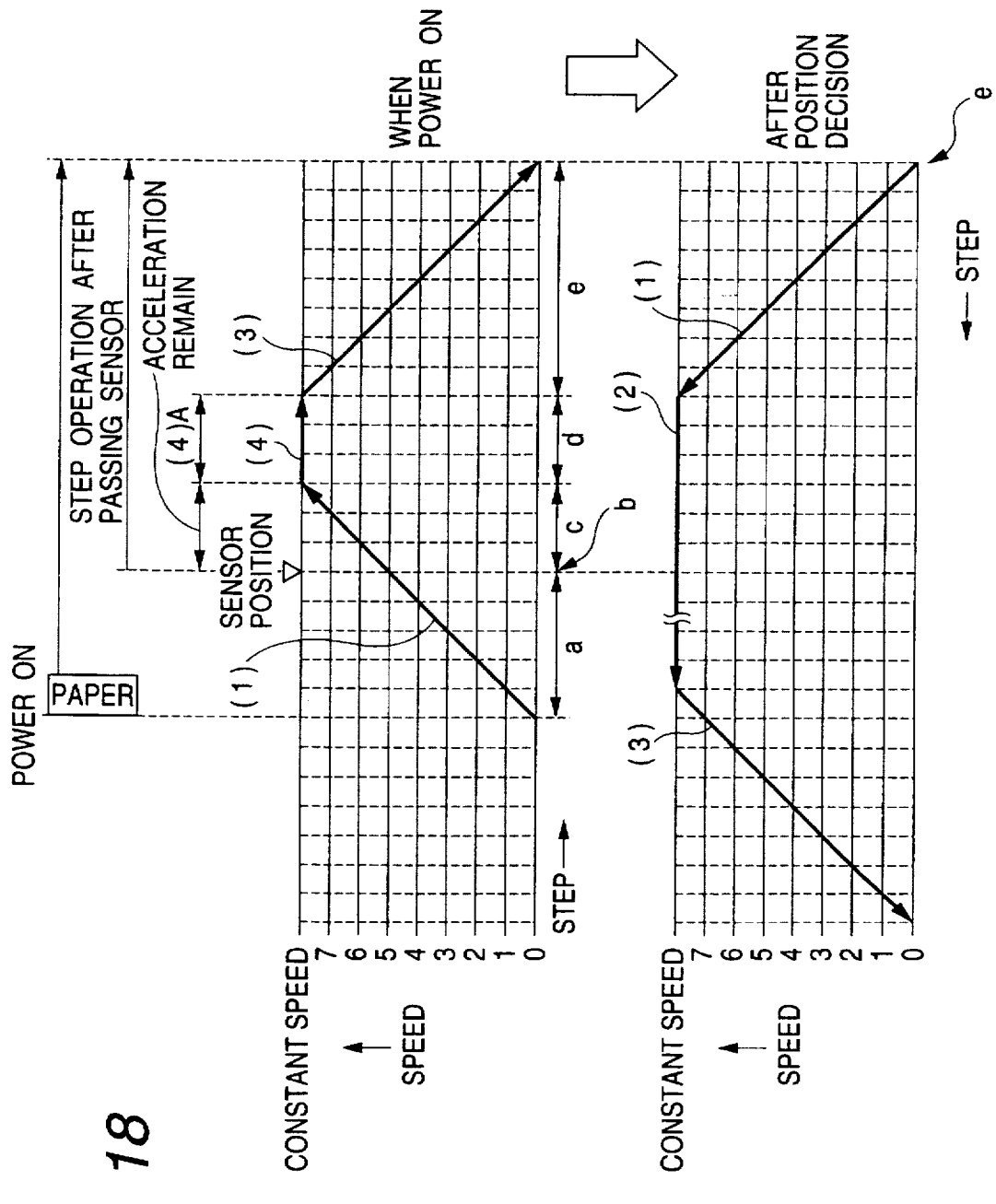
FIG. 18 is a chart illustrating an acceleration operation during which a sensor position is passed.

The operation sequence (refer to FIG. 18) of the first pattern with a sensor position pass during acceleration (host signal constant speed value 4—remaining acceleration= plus) is as follows. After a power is turned on, a normal acceleration operation is performed as indicated at (1) in FIG. 18, and when the sensor position passes, (4)— remaining acceleration=(4)A is calculated to perform the remaining acceleration (without no influence upon register (4)). Further, a host signal constant speed operation is performed as indicated at (4)A and a normal deceleration operation is performed as indicated at (3) to terminate the operation. After the stop position is confirmed, the normal operation starts.

Figure 19:
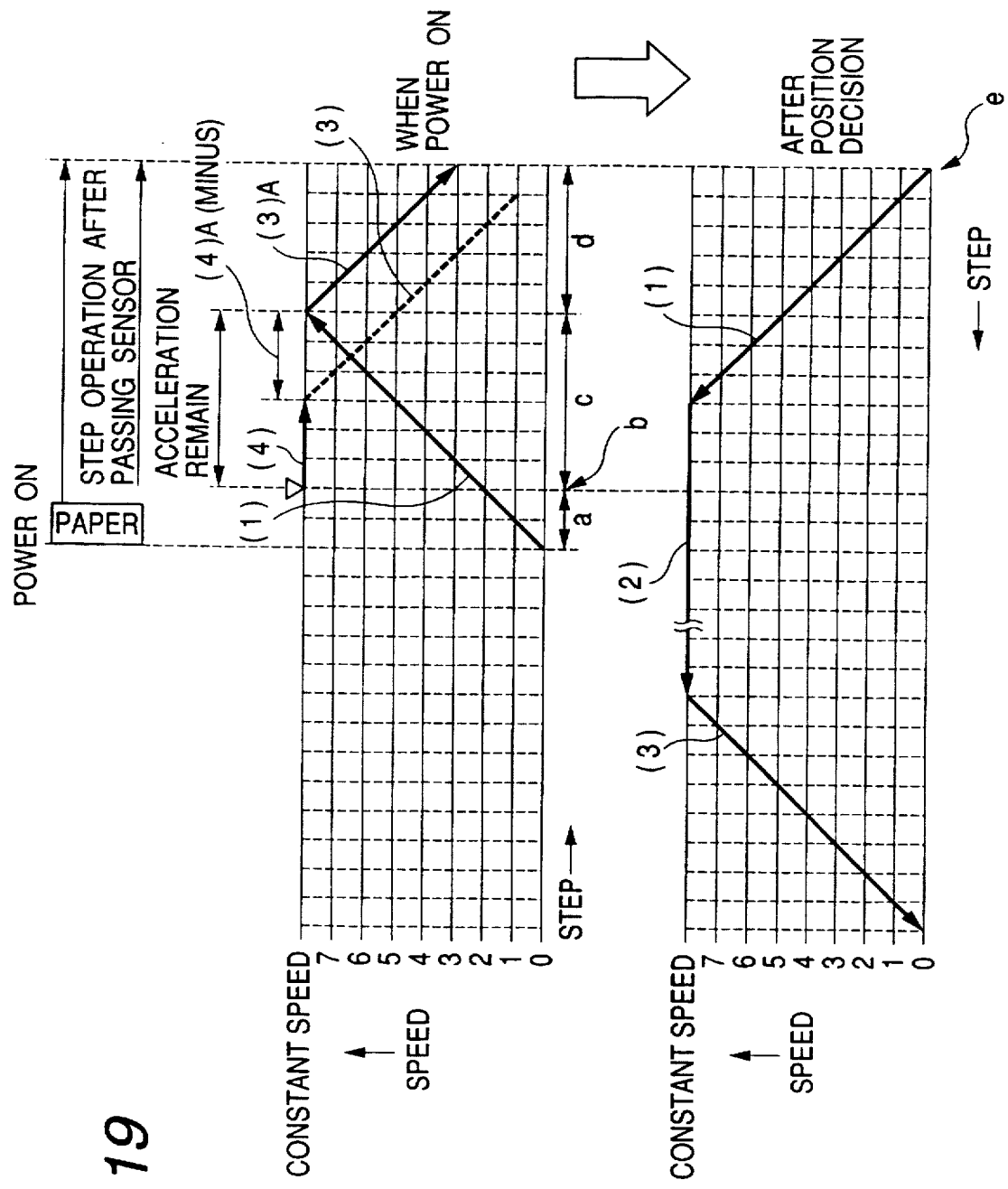
FIG. 19 is a chart illustrating an acceleration operation during which a sensor position is passed.

The operation sequence (refer to FIG. 19) of the second pattern with a sensor position pass during acceleration (host signal constant speed value 4—remaining acceleration= minus) is as follows. After a power is turned on, a normal acceleration operation is performed as indicated at (1) in FIG. 19, and when the sensor position passes, (4)— remaining acceleration=(4)A is calculated which shows a minus value. Further, the remaining acceleration is performed and the minus value (4)A is subtracted from (3) to calculate (3)A (without no influence upon register (3)A) and a normal deceleration is performed as indicated at (3)A. Since the number of steps was reduced at the flow (4)A, the operation stops at a speed (3). After the stop position is confirmed, the normal operation starts.

The remaining acceleration is subtracted from the host signal constant speed value and from the normal acceleration or deceleration value in this order. Step setting is required so that the normal acceleration or deceleration value ((3)A) after subtraction does not become minus. If this value is small, it means an abrupt stop from high speed. Therefore, step setting should be performed while considering this.

Next, interrupt process setting will be described.

Figure 20:
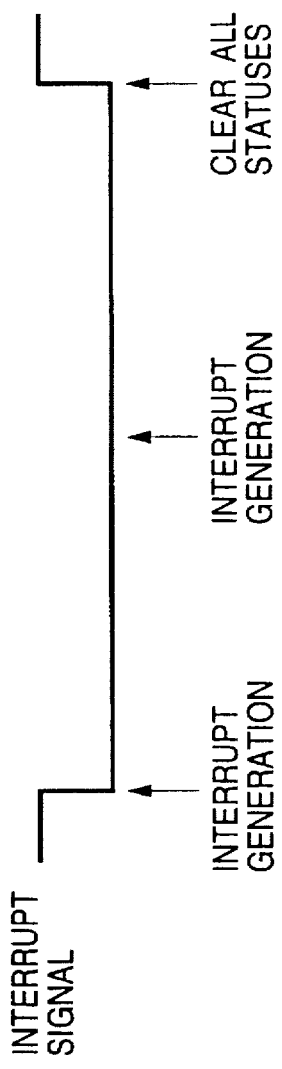
FIG. 20 is a diagram showing the waveform of an interrupt signal.

First, the waveform (refer to FIG. 20) of an interrupt signal will be described. Only one channel among four channels can set an interrupt signal. The interrupt signal is controlled by an interrupt cause setting/status register (IREFTM). The interrupt signal lowers its level when it is generated, and when the status of all interrupt causes is cleared, it raises its level.

Figure 21:
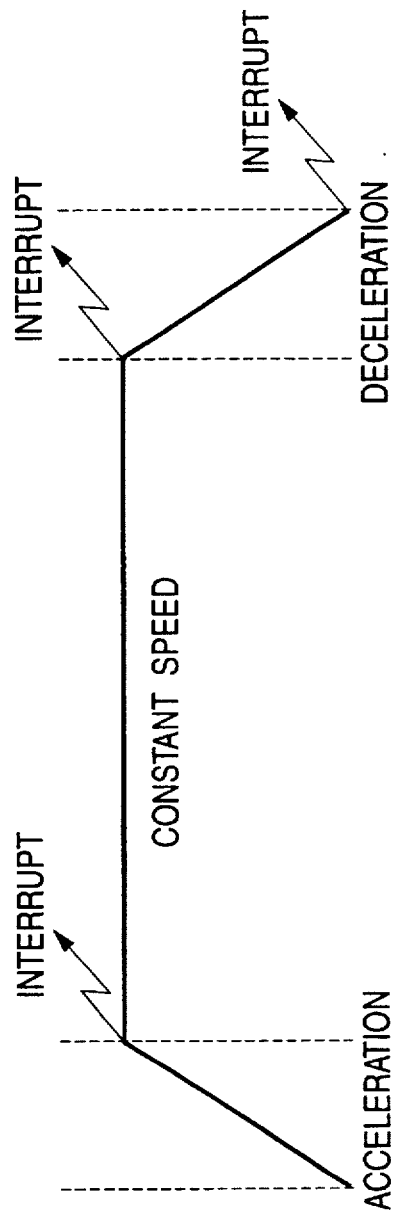
FIG. 21 is a diagram showing an example of an interrupt pattern (acceleration—constant speed—deceleration).
Figures 22, 23:
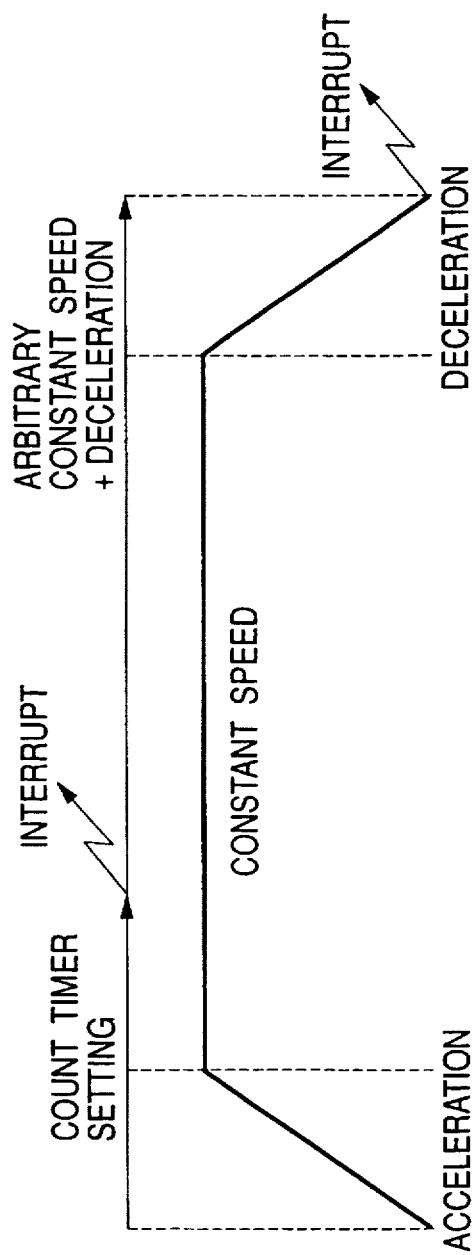
FIG. 22 is a diagram showing an example of an interrupt pattern (with a coincidence of a count timer).
FIG. 23 is a diagram illustrating the function of a prescaler of a timer.

It is possible to set interrupt permission/inhibition of each interrupt cause by setting the bits 4 to 7 of an interrupt cause/timer setting register (IREFTFTM). If a corresponding event occurs in the case of permission, the interrupt signal is output. The bit 4 corresponds to an event of acceleration end, the bit 5 corresponds to an event of constant speed end, the bit 6 corresponds to an event of deceleration end, and the bit 7 corresponds to an event of counter timer coincidence. Typical interrupt generation patterns are (1) acceleration—constant speed—deceleration (refer to FIG. 21) and (2) counter timer coincidence (refer to FIG. 22).

For confirmation and clearing of an interrupt status, a channel with an interrupt cause can be identified by reading the bits 4 to 7 of the second control register (CTR 2). "0" indicates no interrupt and "1" indicates an interrupt. When "0" is written, the interrupt cause is cleared. The bit 4 corresponds to an event of acceleration end, the bit 5 corresponds to an event of constant speed end, the bit 6 corresponds to an event of deceleration end, and the bit 7 corresponds to an event of counter timer coincidence.

For timer setting, the timer has a built-in pre-scaler (refer to FIG. 23) for frequency dividing a clock obtained by dividing a main clock by 4. An input clock supplied to the timer can be selected by setting a timer control register.

The function and settings of the control register group 704a will be detailed.

As described previously, the phase excitation, pattern switching control, phase data rotation direction control, and all OFF outputs can be set by using the first control register (CTR 1).

As described previously, the trigger double speed mode, stepping motor controller operation start and status confirmation, constant speed, host signal input, and confirmation and clearing of interrupt status can be set by using the second control register (CTR 2).

The step count reading register (STPC L/H) operates as described previously. A normal acceleration/deceleration step setting register (STPSTR 1) is used for setting the number of steps required for acceleration/deceleration as described earlier. A normal constant speed step setting register (STPSTR 2 L/H) is used for setting the number of steps required for deceleration as described earlier.

An acceleration timer register (ACC 0–7 L/H) has a 16-bit length and is constituted of eight stages in total. Acceleration control becomes possible if the host writes a desired value as described earlier. A deceleration timer register (SLW 0–7 L/H) has a 16-bit length and is constituted of eight stages in total. Deceleration control becomes possible if the host writes a desired value as described earlier. A constant speed timer register (STAL L/H) has a 16-bit length. A constant speed is determined if the host writes a desired value as described earlier.

An acceleration timer control register (ACCCTL) can set the acceleration timer data use start, write request signal output stage, and write request signal as described earlier. A deceleration timer control register (SLWCTL) can set the deceleration timer data use start, write request signal output stage, and write request signal as described earlier.

As described previously, the interrupt cause/timer setting register (IREFTM) can set the interrupt cause and trigger timer mode. A host signal constant speed step setting register (STPHST L/H) is used for setting a value to be used when a host signal input forcibly causes the stepping motor to stop as described earlier. A count timer coincidence register (CTREG L/H) is used for setting a count value to be used when a count timer coincidence interrupt cause is set as described earlier. A pattern table register (SMPT 0–7) is used for setting phase excitation patterns.

The contents of each register are established at the following timings. (1) The first and second control registers (CTR 1, 2): data latch is always possible and the contents of the register are checked at each access. (2) The step count reading register: a count is automatically written at a period shorter than a minimum trigger. (3) The normal constant speed, acceleration, deceleration step setting registers: the contents are established at the stepping motor controller operation start. (4) The acceleration/constant speed timer registers: the contents are established at the stepping motor controller operation start. (5) The deceleration timer register: the contents are established at the stepping motor controller operation start. (6) The interrupt cause/timer setting register: at the stepping motor controller operation start for the timer setting, and at the interrupt cause occurrence for the interrupt cause setting. (7) The host signal constant speed/deceleration step setting register: the contents are established when a host signal is acknowledged. (8) The count timer coincidence register: the contents are established when an interrupt status is cleared and when the stepping motor controller operation starts. (9) The pattern table register: the contents are established when the stepping motor controller operation starts.

Next, the serial node will be described. As described previously, the stepping motor control unit 704 is connected via the serial I/O control unit 703 to the input serial node with a sensor logic IC connected to sensors, and to the output serial node with a pre-driver IC connected to electromagnetic clutches, stepping motor and the like. Each node will be described hereinunder.

Figure 24:
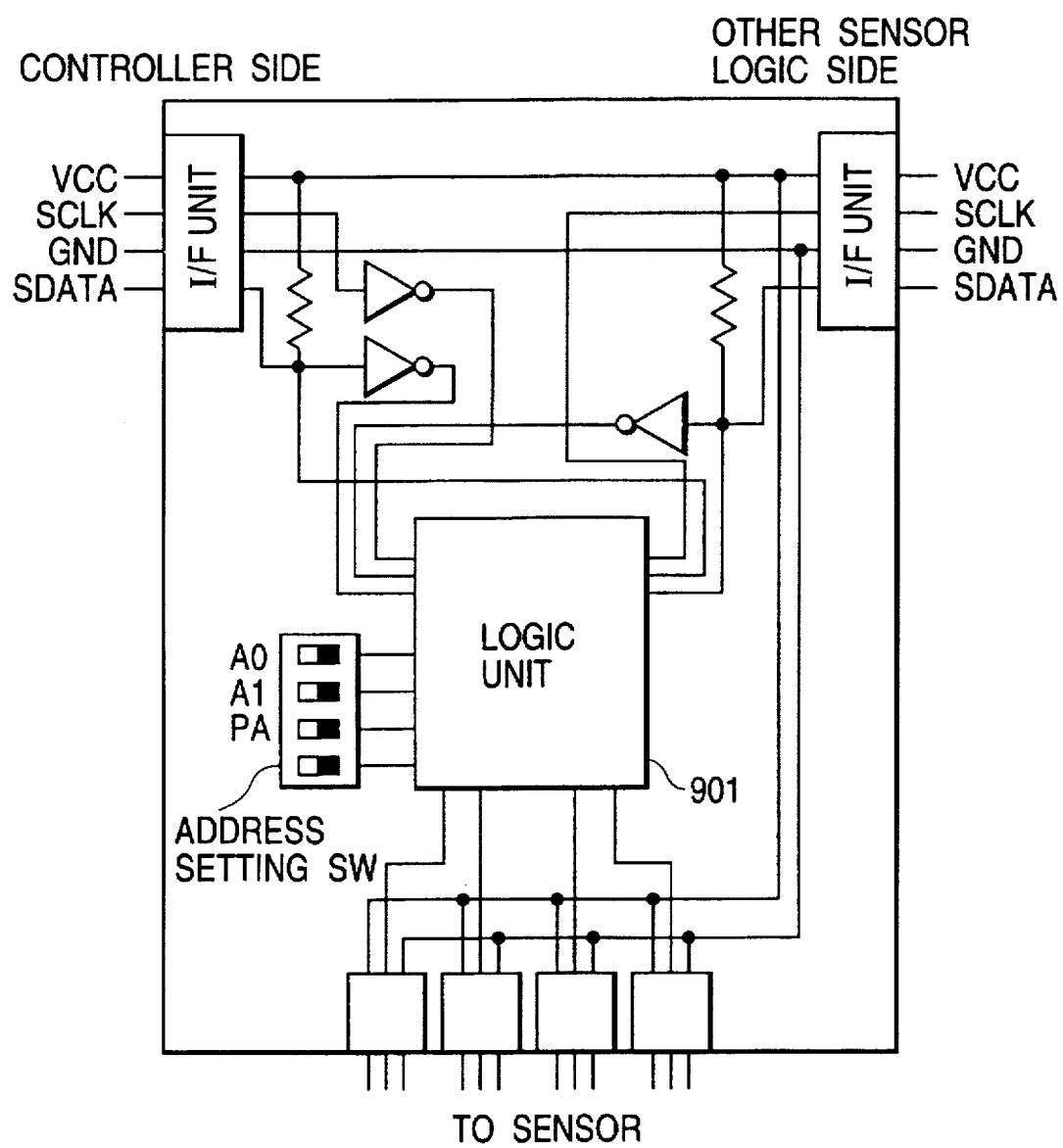
FIG. 24 is a diagram showing the structure of an input serial node.

As shown in FIG. 24, the input serial node has a sensor logic IC with a built-in logic unit 901, a serial signal I/F unit, switches for setting node addresses, and the like. The sensor logic IC sends a serial signal to the serial I/O controller (SIOC) 521 in the reception mode described previously. In practice, if the signal such as address information is received from SIOC 521 and the address is its own address, a data frame is generated in accordance with information from connected sensors and sent to SIOC 521, or a serial signal is output to another node in a packet relay manner.

Figure 25:
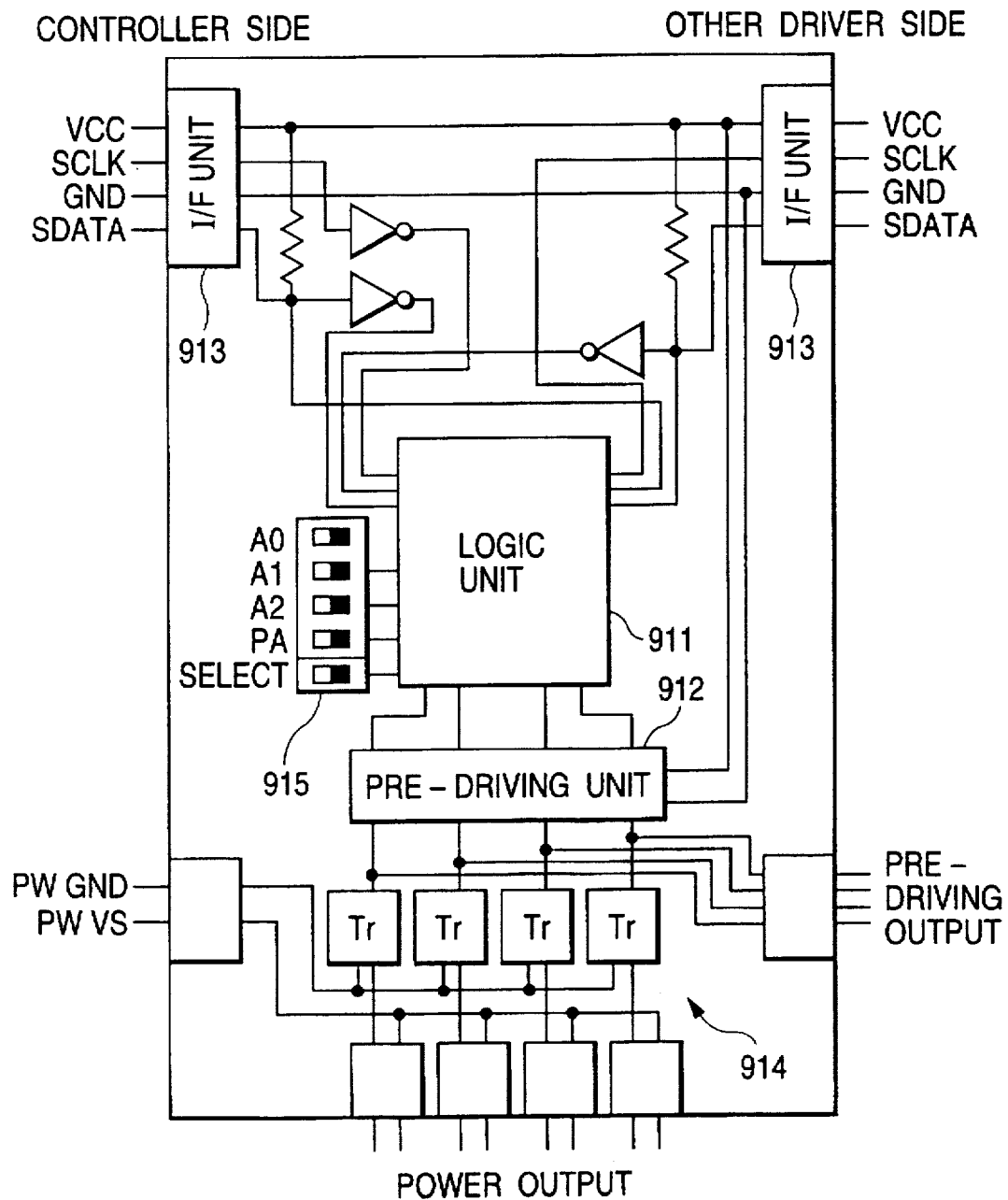
FIG. 25 is a diagram showing the structure of an output serial node.

As shown in FIG. 25, the output serial node has a pre-driver IC with a logic unit 911 and a pre-driver unit 912 built therein, a serial signal I/F unit 913, and if necessary a power driving unit 914, switches 915 for setting node addresses, and the like. The pre-driver IC drives each connected load in accordance with a serial signal sent from the serial I/O controller (SIOC) 521. In practice, a received serial signal is input to an unrepresented shift register of the logic unit, latched by an unrepresented latch of the logic unit, and output via the pre-driver unit 912, or a received serial signal is output to another node in a packet relay manner. An unrepresented strobe signal for stepping motor control is supplied to the logic unit.

As detailed above, the image forming apparatus has the following advantageous effects.

(1) It is possible to mechanically separate an input unit or output unit from a control circuit board having a CPU for controlling the whole apparatus. Accordingly, it is possible to provide a sufficient mount space on the control circuit board.

(2) The number of signal lines between the control circuit board and the input or output unit can be reduced considerably, facilitating the assembly of the apparatus.

(3) The control circuit board including CPU has only data buffers, and a correspondence between data in the data buffers and data on loads or sensors can be changed by software. Therefore, the control circuit board has very high operability between various applications.

(4) Since an interrupt signal is issued to CPU only when the data received via a network unit, a load of a controller CPU can be reduced.

(5) Input data to the input unit such as a sensor is received and updated at a periodical timing. Therefore, a communication load of CPU can be minimized and data can be updated to latest sensor information. A mode of updating information at a desired timing upon instruction from CPU is used for a unit required to be controlled at a precise timing, so that the disadvantage of a mode of updating information at a periodical timing can be avoided. This is also effective for reducing noises on a communication line.

What is claimed is:

1. A controlling apparatus comprising:

first driving means for driving a load not requiring a precise driving timing;

second driving means for driving a load requiring a precise driving timing;

first control means for controlling said first and second driving means; and second control means for controlling the communication between said first and second driving means and said first control means, said second control means communicating with said first driving means independently from a timing signal generated by said first control means and communicating with said second driving means in accordance with the timing signal generated by said first control means.

2. A controlling apparatus according to claim 1, wherein said second control means communicates with said first driving means at each predetermined time.

3. A controlling apparatus according to claim 1, wherein said second control means transmits driving information to said first and second driving means.

4. A controlling apparatus according to claim 1, wherein said first driving means drives a motor which moves a sheet regulate plate of a both-side tray of an image forming apparatus for forming an image on a sheet.

5. A controlling apparatus according to claim 1, wherein said second driving means drives a motor which moves a scanner of a reader for reading an original.

6. A controlling apparatus according to claim 1, wherein said second control means performs serial communications.

7. An image forming apparatus comprising:

status detecting means for detecting a status of each portion of the apparatus;

driving means for driving each portion of the apparatus;

an input unit having input data storing means for storing input data detected by said status detecting means;

an output unit having output data storing means for storing data to be output for driving said driving means;

controlling means connected to said input data storing means and said output data storing means for controlling the whole image forming operation of the apparatus including a control of said driving means, in accordance with a status detected with said status detecting means or a predetermined rule;

network means for transferring data between said controlling means and a plurality of said input or output units; and timing control means for controlling the timing of data transfer over said network means, wherein said timing control means includes a plurality of timing control modes and selects one of the timing control modes in accordance with an instruction from said controlling means.

8. An image forming apparatus according to claim 7, wherein the plurality of timing control modes of said timing control means comprises:

a first timing mode of performing data transfer in accordance with a timing generated by said controlling means; and a second timing mode of performing data transfer independently from the timing generated by said controlling means.

9. An image forming apparatus according to claim 8, wherein said second timing mode is a mode of performing data transfer at a predetermined time interval.

10. A method of controlling an image forming apparatus comprising the steps of:

preparing an image forming apparatus comprising: status detecting means for detecting a status of each portion of the apparatus, driving means for driving each portion of the apparatus, an input unit having input data storing means for storing input data detected by said status detecting means, an output unit having output data storing means for storing data to be output for driving said driving means, controlling means connected to said input data storing means and said output data storing means for controlling the whole image forming operation of the apparatus including a control of said driving means, in accordance with a status detected with said status detecting means or a predetermined rule, network means for transferring data between said controlling means and a plurality of said input or output units, and timing control means for controlling the timing of data transfer over said network means;

providing said timing control means with a plurality of timing control modes; and selecting one of the timing control modes in accordance with an instruction from said controlling means.

11. A method of controlling an image forming apparatus according to claim 10, wherein the plurality of timing control modes of said timing control means comprises:

a first timing mode of performing data transfer in accordance with a timing generated by said controlling means; and a second timing mode of performing data transfer independently from the timing generated by said controlling means.

12. A method of controlling an image forming apparatus according to claim 11, wherein said second timing mode is a mode of performing data transfer at a predetermined time interval.

* * * * *

UNITED STATES PATENT AND TRADEMARK OFFICE
CERTIFICATE OF CORRECTION

PATENT NO. : 5,895,140

DATED : April 20, 1999

INVENTORS : Shokyo Koh, et al.

It is certified that error appears in the above-identified patent and that said Letters Patent is hereby corrected as shown below:

COLUMN 1

Line 51, "t" should be deleted.
Line 52. "his" should be deleted.

COLUMN 5

Line 44, "ten key" should read --ten-key--.

COLUMN 7

Line 25, "(alings)" should read --(aligns)--.

COLUMN 10

Line 20, "test" should read --remotest--.

COLUMN 11

Line 46, "compare. If the parties" should read --compares it with the received--.

Signed and Sealed this

Twenty-eighth Day of December, 1999

Attest:

Q. TODD DICKINSON

Attesting Officer

Acting Commissioner of Patents and Trademarks